(12) United States Patent
Shuto et al.

(10) Patent No.: US 10,023,929 B2
(45) Date of Patent: Jul. 17, 2018

(54) HOT-ROLLED STEEL SHEET

(71) Applicant: NIPPON STEEL & SUMITOMO METAL CORPORATION, Tokyo (JP)

(72) Inventors: Hiroshi Shuto, Tokyo (JP); Masafumi Azuma, Tokyo (JP); Akifumi Sakakibara, Tokyo (JP); Yuuki Kanzawa, Tokyo (JP); Ken Kimura, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/767,807

(22) PCT Filed: May 16, 2014

(86) PCT No.: PCT/JP2014/063026
§ 371 (c)(1),
(2) Date: Aug. 13, 2015

(87) PCT Pub. No.: WO2014/188966
PCT Pub. Date: Nov. 27, 2014

(65) Prior Publication Data
US 2015/0376730 A1 Dec. 31, 2015

(30) Foreign Application Priority Data
May 21, 2013 (JP) .................................. 2013-107324

(51) Int. Cl.
| C22C 38/38 | (2006.01) |
| C22C 38/28 | (2006.01) |
| C22C 38/26 | (2006.01) |
| C22C 38/16 | (2006.01) |
| C22C 38/14 | (2006.01) |

(Continued)

(52) U.S. Cl.
CPC .......... C21D 8/0226 (2013.01); B32B 15/012 (2013.01); B32B 15/013 (2013.01); B32B 15/043 (2013.01); B32B 15/18 (2013.01); C21D 6/001 (2013.01); C21D 6/002 (2013.01); C21D 6/005 (2013.01); C21D 6/008 (2013.01); C21D 8/0263 (2013.01); C21D 8/0426 (2013.01); C21D 8/0473 (2013.01); C21D 9/46 (2013.01); C22C 38/00 (2013.01); C22C 38/001 (2013.01); C22C 38/002 (2013.01); C22C 38/005 (2013.01); C22C 38/02 (2013.01); C22C 38/04 (2013.01); C22C 38/06 (2013.01); C22C 38/08 (2013.01); C22C 38/12 (2013.01); C22C 38/14 (2013.01); C22C 38/16 (2013.01); C22C 38/20 (2013.01); C22C 38/26 (2013.01); C22C 38/28 (2013.01); C22C 38/38 (2013.01); C23C 2/02 (2013.01); C23C 2/06 (2013.01); C23C 30/00 (2013.01); C23C 30/005 (2013.01); C21D 1/20 (2013.01); C21D 2211/002 (2013.01); C21D 2211/008 (2013.01);

(Continued)

(58) Field of Classification Search
CPC ..... B32B 15/18; B32B 15/012; B32B 15/043; B32B 15/013; C23C 2/02; C23C 2/06; C23C 2/26; C23C 2/28; C23C 2/285; C23C 2/00; C23C 30/00; C23C 30/005; C23C 28/021; C23C 28/025; Y10T 428/12799; Y10T 428/12951; Y10T 428/12972; C22C 38/28; C22C 38/38; C22C 38/00; C22C 38/14; C22C 38/58; C22C 38/08; C22C 38/001; C22C 38/18; C22C 38/22; C22C 38/24; C22C 38/32; C22C 38/34; C22C 38/40; C22C 38/42; C22C 38/44; C22C 38/46; C22C 38/48; C22C 38/50; C22C 38/54; C22C 38/005; C22C 38/02; C22C 38/04; C22C 38/06; C22C 38/12; C22C 38/16; C22C 38/20; C22C 38/26; C22C 38/002
See application file for complete search history.

(56) References Cited
U.S. PATENT DOCUMENTS

| 6,221,179 B1 | 4/2001 | Yasuhara et al. |
| 2008/0223491 A1 | 9/2008 | Kimijima |

(Continued)

FOREIGN PATENT DOCUMENTS

| EP | 0 753 596 B1 | 5/2000 |
| JP | 59-219473 A | 12/1984 |

(Continued)

OTHER PUBLICATIONS

Machine Translation, Yasuhiro et al., JP 2009-052106, Mar. 2009.*

(Continued)

Primary Examiner — Michael E. La Villa
(74) Attorney, Agent, or Firm — Birch, Stewart, Kolasch & Birch, LLP

(57) ABSTRACT

A hot-rolled steel sheet has a composition containing: in mass %, C: 0.01 to 0.2%; Si: 2.5% or less; Mn: 4.0% or less; P: 0.10% or less; S: 0.03% or less; Al: 0.001 to 2.0%; N: 0.01% or less; and O: 0.01% or less, and one kind or a total of two kinds of Ti and Nb for 0.01 to 0.30%. An average effective crystal grain diameter at a sheet thickness ¼ part is 10 μm or less, and an average effective crystal grain diameter at a part of a range of 50 μm from a surface is 6 μm or less. A structure of the steel sheet is tempered martensite or lower bainite, and a volume fraction thereof is 90% or more as a total.

6 Claims, No Drawings

(51) Int. Cl.
*C22C 38/12* (2006.01)
*C22C 38/08* (2006.01)
*C22C 38/06* (2006.01)
*C22C 38/04* (2006.01)
*C22C 38/02* (2006.01)
*C22C 38/00* (2006.01)
*B32B 15/01* (2006.01)
*C23C 2/02* (2006.01)
*C23C 2/06* (2006.01)
*C21D 8/02* (2006.01)
*C21D 9/46* (2006.01)
*C21D 6/00* (2006.01)
*C23C 30/00* (2006.01)
*B32B 15/04* (2006.01)
*B32B 15/18* (2006.01)
*C22C 38/20* (2006.01)
*C21D 8/04* (2006.01)
*C21D 1/20* (2006.01)

(52) U.S. Cl.
CPC .................. *Y10T 428/12799* (2015.01); *Y10T 428/12951* (2015.01); *Y10T 428/12972* (2015.01)

(56) References Cited

U.S. PATENT DOCUMENTS

| | | |
|---|---|---|
| 2013/0160904 A1 | 6/2013 | Saito et al. |
| 2013/0276940 A1 | 10/2013 | Nakajima et al. |
| 2013/0319582 A1 | 12/2013 | Yokoi et al. |
| 2014/0007993 A1 | 1/2014 | Nakajima et al. |

FOREIGN PATENT DOCUMENTS

| | | |
|---|---|---|
| JP | 11-092859 A | 4/1999 |
| JP | 11-152544 A | 6/1999 |
| JP | 2001-089811 A | 4/2001 |
| JP | 2004-211199 A | 4/2001 |
| JP | 2004-68050 A | 3/2004 |
| JP | 2005-200673 A | 7/2005 |
| JP | 2007-162076 A | 6/2007 |
| JP | 2007-308744 A | 11/2007 |
| JP | 2008-248341 A | 10/2008 |
| JP | 2008-255484 A | 10/2008 |
| JP | 2008-285748 A | 10/2008 |
| JP | 2009-052106 A | 3/2009 |
| JP | 2010-070789 A | 4/2010 |
| JP | 2011-017044 A | 1/2011 |
| JP | 2011-052321 A | 3/2011 |
| JP | 2012-062561 A | 3/2012 |
| JP | 2012-62562 A | 3/2012 |
| JP | 2012-77336 A | 4/2012 |
| JP | 2006-274335 A | 4/2013 |
| KR | 10-2013-0037226 A | 4/2013 |
| WO | 2010/074473 A2 | 7/2010 |
| WO | WO 2012/133636 A | 3/2011 |

OTHER PUBLICATIONS

Chinese Office Action and Search Report, dated Jun. 30, 2016, for corresponding Chinese Application No. 201480022394.9.
English translation of the International Preliminary Report on Patentability and Written Opinion of the International Searching Authority (Forms PCT/IB/338, PCT/IB/373 and PCT/ISA/237), dated Dec. 3, 2015, for International Application No. PCT/JP2014/063026.
Korean Office Action, dated Jun. 29, 2016, for corresponding Korean Application No. 10-2015-7023646.
International Search Report issued in PCT/JP2014/063026, dated Jul. 15, 2014.
Office Action issued in Taiwanese Patent Application No. 103117668, dated Apr. 28, 2015.
Written Opinion issued in PCT/JP2014/063026, dated Jul. 15, 2014.
Extended European Search Report for European Application No. 14801712.2, dated Oct. 5, 2016.
Korean Office Action dated Nov. 25, 2016, issued in Korean Patent Application No. 10-2015-7023646.

* cited by examiner

HOT-ROLLED STEEL SHEET

TECHNICAL FIELD

The present invention relates to a hot-rolled steel sheet having a maximum tensile strength of 980 MPa or more, excellent in fatigue strength and low-temperature toughness, and a manufacturing method thereof. In particular, the present invention relates to a hot-rolled steel sheet which withstands use at a member where stresses are repeatedly loaded, and includes the fatigue strength and low-temperature toughness enabling the use in a cryogenic region, and a manufacturing method thereof.

BACKGROUND ART

Reduction in weight of a vehicle body has been advanced by using a high-strength steel sheet to suppress emission of carbon dioxide gas from a vehicle. Besides, a lot of high-strength steel sheets with a maximum tensile strength of 980 MPa or more have been used for the vehicle body in addition to a mild steel sheet to secure safety of passengers. Further, it is necessary to enhance a usage strength level of the high-strength steel sheet more than before to further advance the reduction in weight of the vehicle body. The high-strengthening of the steel sheet is generally accompanied by deterioration of material properties such as the low-temperature toughness, and therefore, it is important in development of the high-strength steel sheet how to enable the high-strengthening without deteriorating the material properties.

The fatigue strength of the steel sheet is a property required for important safety-related parts centering on steel sheets for underbody parts of the vehicle. The reduction in weight of parts cannot be enabled if the fatigue strength is not improved together with the high-strengthening of the steel sheet. Accordingly, fatigue properties are defined not only by the strength but also by a fatigue limit in which fatigue fracture does not occur due to a stress smaller than that, and a fatigue strength at finite life being a fatigue life when a certain stress or strain is loaded.

Besides, there is a requirement for the steel sheet used for the member as stated above that the member is difficult to be fractured even if it is impacted by a collision or the like after the steel sheet is formed as the member and attached to the vehicle. Further, there also is a requirement to improve the low-temperature toughness to secure impact resistance at a cold district. This low-temperature toughness is defined by vTrs (Charpy fracture appearance transition temperature) or the like. Therefore, it is necessary to consider the impact resistance in itself of the steel sheet. In addition, plastic deformation of the steel sheet becomes difficult due to the high-strengthening of the steel sheet, and therefore, anxiety for fracture becomes higher. Accordingly, toughness is required as an important property.

It is effective to refine a structure to improve the fatigue properties. For example, in Patent Literature 1 and Patent Literature 2, a hot-rolled steel sheet in which an average grain diameter of ferrite is set to be 2 μm or less, and a strength-ductility balance and a fatigue limit ratio (fatigue strength/TS) are good is disclosed. However, these steel sheets have a structure whose main phase is the ferrite, and it is difficult to secure the strength of 980 MPa or more.

Besides, fatigue cracks occur from a vicinity of a surface, and therefore, it is particularly important to refine the structure in the vicinity of the surface. For example, in Patent Literature 3, a hot-rolled steel sheet in which a main phase thereof is polygonal ferrite, an average crystal grain diameter of the polygonal ferrite becomes gradually small from a center of a sheet thickness toward a surface layer to be a crystal grain diameter inclined structure is disclosed. This hot-rolled steel sheet is one in which a polygonal ferrite fraction is gradually refined from the center part of the sheet thickness toward the surface layer part of the sheet thickness by applying bending after hot-rolling.

Further, in Patent Literature 4, a hot-rolled steel sheet is disclosed in which polygonal ferrite is a main phase, and a crystal grain diameter in a vicinity of a surface layer is set to be 20% or less of a grain diameter at a center part of a sheet thickness. This hot-rolled steel sheet is one in which rolling is performed in a ferrite region, the surface layer is reverse transformed by a process heat generation at the hot-rolling time to thereby refine the structure at the surface layer.

These hot-rolled steel sheets are excellent in the fatigue properties, but a manufacturing method thereof is complicated, preferred manufacturing conditions are narrow, and therefore, lowerings in productivity and yield are worried. Besides, the main phase is the ferrite, and therefore, it is difficult to secure the strength of 980 MPa or more.

On the other hand, a martensite structure is extremely hard, and therefore, in a steel sheet having high-strength of 980 MPa class or more, it is often the case that the martensite structure is used as the main phase or a second phase for strengthening. In Patent Literature 5, improvement in the fatigue properties by grain refining in a structure in which the martensite structure is the main phase is described. Note that this is an art in a steel-pipe field, and is one in which a diameter is reduced after a pipe-making, and an average block diameter of martensite is set to be 3 μm or less by quenching after heating. It is necessary to install a heating and quenching device after a finish rolling to apply the similar method for the hot-rolled steel sheet to improve the fatigue strength, and there is a problem in which a large investment is necessary.

On the other hand, for example, in Patent Literature 6, a manufacturing method is disclosed in which a martensite phase whose aspect ratio is adjusted is set to be a main phase of a structure of a steel sheet, as a method to improve the toughness of the steel sheet.

In general, it is known that the aspect ratio of the martensite depends on an aspect ratio of an austenite grain before transformation. Here, the martensite whose aspect ratio is large means the martensite transformed from non-recrystallized austenite (austenite which is extended by rolling). Besides, the martensite whose aspect ratio is small means the martensite transformed from recrystallized austenite.

Therefore, it is necessary for the steel sheet according to Patent Literature 6 to recrystallize the austenite to reduce the aspect ratio. In addition, it is necessary to increase a finish rolling temperature to enable the recrystallization of the austenite. Accordingly, there is a tendency in which a grain diameter of the austenite, furthermore a grain diameter of the martensite become large. In general, it is known that grain refining is effective to improve the toughness. Therefore, when the aspect ratio is lowered, it is possible to reduce a factor of toughness deterioration resulting from a shape, but it is accompanied by the toughness deterioration resulting from coarsening of a crystal grain diameter, and therefore, there is a limit in improvement in toughness. In addition, it is not mentioned as for the fatigue strength, and it is difficult to say that enough fatigue strength is secured.

CITATION LIST

Patent Literatures

Patent Literature 1: Japanese Laid-open Patent Publication No. H11-92859
Patent Literature 2: Japanese Laid-open Patent Publication No. H11-152544
Patent Literature 3: Japanese Laid-open Patent Publication No. 2004-211199
Patent Literature 4: Japanese Laid-open Patent Publication No. 2007-162076
Patent Literature 5: Japanese Laid-open Patent Publication No. 2010-70789
Patent Literature 6: Japanese Laid-open Patent Publication No. 2011-52321
Patent Literature 7: Japanese Laid-open Patent Publication No. 2011-17044
Patent Literature 8: Japanese Laid-open Patent Publication No. 2012-62561
Patent Literature 9: Japanese Laid-open Patent Publication No. 2009-52106
Patent Literature 10: Japanese Laid-open Patent Publication No. 2008-285748
Patent Literature 11: Japanese Laid-open Patent Publication No. 2008-255484
Patent Literature 12: Japanese Laid-open Patent Publication No. 2005-200673

SUMMARY OF INVENTION

Technical Problem

The present invention is made in consideration of the above-stated problems, and an object thereof is to provide a hot-rolled steel sheet having a maximum tensile strength of 980 MPa or more, excellent fatigue strength and low-temperature toughness, and a manufacturing method thereof.

Solution to Problem

The present inventors were successful in manufacturing a hot-rolled steel sheet which is excellent in fatigue strength and low-temperature toughness and has a maximum tensile strength of 980 MPa or more by optimizing a composition of the hot-rolled steel sheet and manufacturing conditions, and controlling a structure of the hot-rolled steel sheet. Summaries thereof are as follows.

(1) A hot-rolled steel sheet having a maximum tensile strength of 980 MPa or more, excellent in fatigue strength and low-temperature toughness, includes a composition containing: in mass %,
C: 0.01 to 0.2%;
Si: 2.5% or less (excluding "0" (zero));
Mn: 4.0% or less (excluding "0" (zero));
P: 0.10% or less;
S: 0.03% or less;
Al: 0.001 to 2.0%;
N: 0.01% or less (excluding "0" (zero));
O: 0.01% or less (excluding "0" (zero)); and
either one of or a total of both of Ti and Nb for 0.01 to 0.30%; and the balance made up of iron and impurities, and
a structure in which a volume fraction of either one of or a total of both of tempered martensite and lower bainite is 90% or more,
wherein an average effective crystal grain diameter at a part of a range of ¼ of a sheet thickness from a surface is 10 µm or less, and an average effective crystal grain diameter at a part of a range of 50 µm from the surface is 6 µm or less.

(2) The hot-rolled steel sheet according to (1), wherein iron-based carbides existing in either one of or both of the tempered martensite and lower bainite are $1 \times 10^6$ (pieces/mm$^2$) or more, and an average aspect ratio of effective crystal grains of either one of or both of the tempered martensite and lower bainite is two or less.

(3) The high-strength hot-rolled steel sheet according to (1) or (2), further contains, in mass %, one kind or two or more kinds selected from a group made up of: Cu: 0.01 to 2.0%; Ni: 0.01 to 2.0%; Mo: 0.01 to 1.0%; V: 0.01 to 0.3%; and Cr: 0.01 to 2.0%.

(4) The hot-rolled steel sheet according to any one of (1) to (3), further contains, in mass %, one kind or two or more kinds selected from a group made up of: Mg: 0.0005 to 0.01%; Ca: 0.0005 to 0.01%; and REM: 0.0005 to 0.1%.

(5) The hot-rolled steel sheet according to any one of (1) to (4), further contains, in mass %, B: 0.0002 to 0.01%.

(6) The hot-rolled steel sheet according to any one of (1) to (5), wherein a galvanized layer or an alloyed galvanized layer is included at a surface of the steel sheet.

(7) A manufacturing method of a hot-rolled steel sheet, includes:
smelting into a composition containing:
in mass %,
C: 0.01 to 0.2%;
Si: 2.5% or less (excluding "0" (zero));
Mn: 4.0% or less (excluding "0" (zero));
P: 0.10% or less;
S: 0.03% or less;
Al: 0.001 to 2.0%;
N: 0.01% or less (excluding "0" (zero));
O: 0.01% or less (excluding "0" (zero)); and
either one of or a total of both of Ti and Nb for 0.01 to 0.30%, and the balance made up of iron and impurities, and
thereafter, heating a cast slab to 1200° C. or more directly or after it is once cooled; completing a hot-rolling under a condition satisfying $R/(100-r) \geq 8$, and at 900° C. or more when a diameter of a rolling mill roll is set to be R/mm, and a reduction ratio is set to be r %, at a final stage of a finish-rolling; cooling at an average cooling rate of 60° C./sec or more from a finish rolling temperature to 700° C., at an average cooling rate of 50° C./sec or more from 700° C. to 400° C., and at an average cooling rate of less than 50° C./sec from 400° C. to a room temperature, and coiling at a temperature of less than 400° C.

(8) The manufacturing method of the hot-rolled steel sheet according to (7), wherein the cast slab further contains: in mass %, one kind or two or more kinds selected from a group made up of:
Cu: 0.01 to 2.0%;
Ni: 0.01 to 2.0%;
Mo: 0.01 to 1.0%;
V: 0.01 to 0.3%; and
Cr: 0.01 to 2.0%.

(9) The manufacturing method of the hot-rolled steel sheet according to (7) or (8), wherein the cast slab further contains: in mass %, one kind or two or more kinds selected from a group made up of:
Mg: 0.0005 to 0.01%;
Ca: 0.0005 to 0.01%; and
REM: 0.0005 to 0.1%.

(10) The manufacturing method of the hot-rolled steel sheet according to any one of (7) to (9), wherein the cast slab further contains: in mass %, B: 0.0002 to 0.01%.

(11) The manufacturing method of the hot-rolled steel sheet according to any one of (7) to (10), further includes: performing a galvanizing treatment or an alloyed galvanizing treatment after the coiling.

Advantageous Effects of Invention

According to the present invention, it is possible to provide a hot-rolled steel sheet which is excellent in fatigue strength and low-temperature toughness, and has a maximum tensile strength of 980 MPa or more, and a manufacturing method thereof.

DESCRIPTION OF EMBODIMENTS

Hereinafter, contents of the present invention are described in detail.

As a result of hard study of the present inventors or the like, it is found that high strength of 980 MPa or more, high fatigue strength and low-temperature toughness can be secured by setting a structure of a hot-rolled steel sheet to be a structure in which an average effective crystal grain diameter at a part of a range of ¼ of a sheet thickness from a surface is 10 µm or less, the average effective crystal grain diameter at a part of a range of 50 µm from the surface is 6 µm or less, and either one of or a total of both of tempered martensite and lower bainite is contained for 90% or more in a volume fraction, further preferably, it is set to be one in which an average aspect ratio of the tempered martensite and lower bainite is set to be two or less, and iron-based carbides existing in the tempered martensite and lower bainite are contained for $1 \times 10^6$ (pieces/mm$^2$).

Here, an effective crystal grain diameter is a region surrounded by a grain boundary of a misorientation of 15° or more, and is able to be measured by using EBSD or the like. Details thereof are Described Later.

[Microstructure of Hot-Rolled Steel Sheet]

At first, a microstructure of a hot-rolled steel sheet of the present invention is described.

In the hot-rolled steel sheet of the present invention, a main phase is set to be either one of or both of tempered martensite and lower bainite, and a total volume fraction is set to be 90% or more, and thereby, a maximum tensile strength of 980 MPa or more and high fatigue strength are secured. Accordingly, it is necessary that the main phase is set to be either one of or both of the tempered martensite and lower bainite.

The tempered martensite in the present invention is a most important microstructure for the hot-rolled steel sheet to have the strength, the fatigue strength, and the low-temperature toughness. The tempered martensite is an aggregation of lath-shaped crystal grains, and contains the iron-based carbide whose major axis is 5 nm or more inside thereof. Further, the iron-based carbide is one belonging to a plurality of variants, namely, a plurality of iron-based carbide groups extending in different directions.

The structure of the tempered martensite is able to be obtained when a cooling rate at a cooling time of an Ms point (martensite transformation start temperature) or less is lowered, and when it is tempered at 100° C. to 600° C. after it is once made to be a martensite structure. In the present invention, precipitation is controlled by a cooling control between 400° C. and a room temperature.

The lower bainite is also the aggregation of the lath-shaped crystal grains, and contains the iron-based carbide whose major axis is 5 nm or more inside thereof. Further, the iron-based carbide is one belonging to a single variant, namely, to an iron-based carbide group extending in the same direction. Whether it is the tempered martensite or the lower bainite can be easily distinguished by observing the extending direction of the iron-based carbide. Here, the iron-based carbide group extending in the same direction means one whose difference in the extending direction of the iron-based carbide group is within 5°.

The lower bainite is generated from 400° C. to around the Ms point, and there is a case when it is generated at the Ms point or less while conflicting with martensite. When the cooling rate at 400° C. or less is relatively large, the martensite is formed, and when it is small, the lower bainite is formed.

When the volume fraction of either one of or a total of both of the tempered martensite and the lower bainite is less than 90%, the maximum tensile strength of 980 MPa or more being an essential point of the present invention cannot be secured, and the high fatigue strength being the effect of the present invention cannot also be obtained. Accordingly, a lower limit thereof is 90%. On the other hand, when the volume fraction is set to be 100%, the strength, the high fatigue strength and the excellent low-temperature toughness being the effects of the present invention are exerted. Note that the lower bainite is desirably 5% or more, and further desirably 9%. The volume fraction of the lower bainite increases, then there is a tendency in which the average effective crystal grain diameter at a sheet thickness ¼ part becomes small.

In the structure of the hot-rolled steel sheet, one kind or two or more kinds may be contained for 10% or less in the total volume fraction of ferrite, fresh martensite, upper bainite, pearlite, retained austenite as the other structures.

Here, the fresh martensite is defined to be the martensite which does not contain carbide. The fresh martensite is high-strength, but it is deteriorated in the low-temperature toughness, and therefore, it is necessary to limit the volume fraction to be 10% or less.

The retained austenite transforms into the fresh martensite when a steel material is plastically deformed at a press forming time or when a vehicle member is plastically deformed at a collision time, and therefore, there is the similar negative effect as the above-stated fresh martensite. Therefore, the volume fraction is necessary to be limited to 10% or less.

The upper bainite is an aggregation of lath-shaped crystal grains, and is an aggregation of laths containing carbide between laths. The carbides contained between laths become starting points of fracture, and therefore, the low-temperature toughness is lowered. Besides, the upper bainite is formed at a high temperature compared to the lower bainite, and therefore, it is low-strength. Accordingly, when the upper bainite is excessively formed, it is difficult to secure the maximum tensile strength of 980 MPa or more, and the fatigue strength is lowered. This tendency becomes remarkable when the volume fraction of the upper bainite exceeds 10%, and therefore, it is necessary to limit the volume fraction to be 10% or less.

The ferrite is a massive crystal grain, and means a structure in which a substructure such as lath is not contained inside thereof. The ferrite is a softest structure, and it lowers the tensile strength and fatigue strength, and therefore, it is necessary to limit to be 10% or less to secure the maximum tensile strength of 980 MPa or more and the high fatigue strength. Besides, the ferrite is extremely soft compared to either one of or both of the tempered martensite and lower bainite being the main phase, and therefore, deformations concentrate at interfaces of both structures, and they may be easily the starting points of fracture. As stated above, the ferrite lowers the low-temperature toughness. This tendency becomes remarkable when the volume fraction exceeds 10%, and therefore, it is necessary to limit the volume fraction to be 10% or less.

The pearlite also causes to lower the tensile strength and fatigue strength, and to deteriorate the low-temperature toughness as same as the ferrite, and therefore, it is necessary to limit the volume fraction to be 10% or less.

The tempered martensite, fresh martensite, upper bainite, lower bainite, ferrite, pearlite, austenite, and a remaining structure constituting the above-stated steel sheet structure of the present invention are able to be performed to identify these structures, verify existing positions, and measure area ratios according to methods as described below. Namely, a rolling direction cross-section or a rolling direction orthogonal direction cross-section of a steel sheet is corroded by using a nital reagent and a reagent disclosed in Japanese Laid-open Patent Publication No. S59-219473 to be observed with a scanning and transmission electron microscope at a magnification of 1000 times to 100000 times, and thereby, it is possible to identify these structures, verify the existing positions, and measure the area ratios.

Besides, it is also possible to distinguish the structure from a crystal orientation analysis using a crystal orientation analysis method using the FESEM-EBSP method [the electron back-scatter diffraction (EBSD) attached to the field emission scanning electron microscope (FE-SEM)], and a hardness measurement of a minute region such as the micro Vickers hardness measurement. For example, as stated above, the tempered martensite, upper bainite, and lower bainite have different formation sites and crystal orientation relations (extending directions) of carbide, and therefore, the iron-based carbide in the lath-shaped crystal grain is observed by using the FE-SEM, the extending direction thereof is examined, and thereby, it is possible to easily distinguish the upper bainite, lower bainite, and tempered martensite.

In the present invention, each of the volume fractions of the ferrite, pearlite, upper bainite, lower bainite, tempered martensite, and fresh martensite is obtained by gathering a sample while using a sheet thickness cross-section which is in parallel to the rolling direction of the hot-rolled steel sheet as an observation surface, polishing the observation surface, and performing the nital etching. A range of ⅛ thickness to ⅜ thickness centering on a position at a depth of ¼ from a surface of a sheet thickness is observed by the FE-SEM to measure the area fraction, and the result is used as the volume fraction. Besides, 10 visual fields are each measured at a magnification of 5000 times, and an average value is set to be an area ratio.

The fresh martensite and retained austenite are not enough corroded by the nital etching, and therefore, it is possible to clearly distinguish from the above-stated structures (the ferrite, bainitic ferrite, upper bainite, lower bainite, and tempered martensite) in the observation by the FE-SEM. Accordingly, the volume fraction of the fresh martensite is able to be found as a difference between an area fraction of a region which is not corroded observed by the FE-SEM and an area fraction of the retained austenite measured by the X-ray.

Subsequently, the crystal grain diameter of the hot-rolled steel sheet is described.

It is necessary that an average effective crystal grain diameter at a part of a range of ¼ of a sheet thickness from a surface of a hot-rolled steel sheet (hereinafter, this part is referred to as "the sheet thickness ¼ part") is set to be 10 μm or less, and an average effective crystal grain diameter at a part of a range of 50 μm from the surface is 6 μm or less to enable the improvement in the fatigue strength. This is to suppress occurrences of fatigue cracks from a surface layer by especially refining the average effective crystal grain diameter at the surface layer. The present inventors or the like examined a relationship between the fatigue strength and the average effective crystal grain diameter at the sheet thickness ¼ part and at the part of the range of 50 μm from the surface, then it becomes obvious that the excellent fatigue strength can be obtained when they are 10 μm or less at the sheet thickness ¼ part, and 6 μm or less at the part of the range of 50 μm from the surface. The average effective crystal grain diameter is desirably 5 μm or less at the part of the range of 50 μm from the surface, and further desirably 4 μm or less at the part of the range of 50 μm from the surface.

Here, an identification method of the average effective crystal grain diameter is described. In the present invention, the average effective crystal grain diameter is defined by using the EBSP-OIM (electron back scatter diffraction pattern-orientation image microscopy) method. In the EBSP-OIM method, a device and software are constituted in which electron beam is irradiated on a sample which highly inclines in the scanning electron microscope (SEM), the Kikuchi pattern formed by backscattering is photographed by a high-sensitive camera, it is image-processed by a computer to thereby measure a crystal orientation at an irradiation point within a short period of time. According to the EBSP-OIM method, it is possible to quantitatively analyze a microstructure and a crystal orientation at a surface of a bulk sample. Besides, an analysis area of the EBSP-OIM method is an area which can be observed by the SEM, and it is possible to analyze at a resolution of 20 nm at minimum according to the EBSP-OIM method though it depends on a resolution of the SEM. In the present invention, a misorientation of the crystal grains is defined to be 15° being a threshold value of a high-angle grain boundary which is generally recognized as a crystal grain boundary, a grain is visualized from a mapped image, and the average effective crystal grain diameter is found.

When the average effective crystal grain diameters at the sheet thickness ¼ part and at the part of the range of 50 μm from the surface are measured, 10 visual fields are each measured centering on each position at a magnification of 1200 times, and an average of the effective crystal grain diameters is set to be the average effective crystal grain diameter.

Further, it is preferable that the iron-based carbide is contained in the structure for $1\times10^6$ (pieces/mm$^2$) or more in each of the tempered martensite and lower bainite.

A reason for containing the iron-based carbide for $1\times10^6$ (pieces/mm$^2$) or more is to increase the low-temperature toughness of a parent phase, and to obtain a balance between the excellent strength and the low-temperature toughness. Namely, the tempered martensite as it is excellent in the strength, but lacks in the toughness, and an improvement thereof is necessary. Accordingly, the iron-based carbide is precipitated for a predetermined number or more to thereby improve the toughness of the main phase.

The present inventors examined a relationship between the low-temperature toughness and a number density of the iron-based carbide, then it becomes clear that it is possible to secure the excellent low-temperature toughness by setting the number density of the iron-based carbides in the tempered martensite and lower bainite to be $1 \times 10^6$ (pieces/mm$^2$) or more. Therefore the number density of the iron-based carbide is desirably set to be $1 \times 10^6$ (pieces/mm$^2$) or more. It is more desirably $5 \times 10^6$ (pieces/mm$^2$) or more, and further desirably $1 \times 10^7$ (pieces/mm$^2$) or more.

Besides, a size of the iron-based carbide precipitated by a process of the present invention is small such as 300 nm or less, and most of them are precipitated in the laths of the martensite and bainite, and therefore, it is estimated that the low-temperature toughness is not deteriorated.

As a method to measure the number density of the iron-based carbide, at first, a sample is gathered while using the sheet thickness cross-section which is in parallel to the rolling direction of the hot-rolled steel sheet as an observation surface. The observation surface of the sample is polished, nital-etched, and the range from ⅛ thickness to ⅜ thickness centering on the position of the depth of ¼ from the surface of the steel sheet is observed by the FE-SEM to thereby measure the number density of the iron-based carbide. At this time, 10 visual fields are each observed at the magnification of 5000 times to measure the number density of the iron-based carbide.

Besides, it is desirable that an average aspect ratio of the effective crystal grains of the tempered martensite and lower bainite (here, it means a region surrounded by the grain boundary of 150 or more) is set to be two or less. The crystal grain which is flat in a specific direction has large anisotropy, and it is often a case that cracks propagate along the grain boundary at the Charpy test time to lower a toughness value. Accordingly, it is effective that the effective crystal grains are made to be equiaxial grains as much as possible. In the present invention, the rolling direction cross-section of the hot-rolled steel sheet is observed, a ratio between a length (L) in the rolling direction and a length (T) in the sheet-thickness direction (=L/T) is defined as the aspect ratio, and an average value thereof (namely, the average aspect ratio) is set to be two or more.

[Chemical Composition of Hot-Rolled Steel Sheet]

Next, limitation reasons of a chemical composition of the hot-rolled steel sheet of the present invention are described. Note that "%" of a content is a mass %.

(C: 0.01 to 0.2%)

C is an element which contributes to increase in the strength and improvement in the fatigue strength of a base material, but it is also the element which generates the iron-based carbide such as cementite (Fe$_3$C) to be starting points of cracks at a hole expansion time, and deteriorates the low-temperature toughness. It is impossible to obtain an effect of a strength improvement owing to a structure strengthening by a low-temperature transformation generating phase when a C content is less than 0.01%. On the other hand, when the C content is over 0.2%, ductility of the steel sheet decreases, the iron-based carbide such as cementite (Fe$_3$C) to be the starting points of cracks when an impact is applied increases, and the low-temperature toughness deteriorates. Accordingly, the C content is set to be within a range of 0.01 to 0.2%.

(Si: 2.5% or Less (Excluding "0" (Zero))

Si is an element which contributes to increase in the strength of the base material, and is able to be used as a deoxidizing material of a molten steel, and therefore, it is preferably contained within a range of 0.001% or more according to need. However, when a content exceeds 2.5%, the contribution to the strength increasing saturates, in addition, formation of ferrite is accelerated due to Si. As a result, it becomes difficult to set the volume fraction of either one of or the total of both of the tempered martensite and lower bainite to be 90% or more, and the strength and low-temperature toughness deteriorate. Accordingly, the Si content is set to be 2.5% or less.

(Mn: 4% or Less (Excluding "0" (Zero))

Mn is contained to set either one of or both of the tempered martensite and lower bainite as the main phase in the steel sheet structure by quench strengthening in addition to solid-solution strengthening. When an Mn content is over 4%, it becomes difficult to set the density of the iron-based carbides of either one of or both of the tempered martensite and lower bainite to be $1 \times 10^6$ (pieces/mm$^2$) or more. Besides, an effect of the quench strengthening also saturates. Accordingly, the Mn content is set to be 4% or less. On the other hand, when the Mn content is less than 1%, it is difficult to exert a suppression effect of a ferrite transformation and a bainite transformation during cooling. Accordingly, the Mn content is desirably 1% or more.

(Ti, Nb: 0.01 to 0.30% as One of or a Total of Both)

Either one of or both of Ti and Nb are the most important elements to enable both the excellent low-temperature toughness and the high strength of 980 MPa or more. These carbonitrides, or either one of or both of solid-solution Ti and Nb delay grain growth at the hot-rolling time, and thereby, it is possible to refine the grain diameter of the hot-rolled steel sheet, and to contribute to the improvement in the low-temperature toughness. Among them, Ti is especially important because it contributes to the improvement in the low-temperature toughness by refining the crystal grain diameter at a slab heating time by existing as TiN in addition to a property of the grain growth owing to solid-solution N. It is necessary that either one of or the total of Ti and Nb is to be contained for 0.01% or more to make the average effective crystal grain diameter of the hot-rolled steel sheet to be 10 μm or less. Besides, when the content of either one of or the total of both of Ti and Nb exceeds 0.30%, austenite is difficult to be recrystallized at a normal rolling temperature, the grain becomes one extending in the rolling direction, and thereby, the toughness is deteriorated. Accordingly, a range of the content of either one of or the total of both of Ti and Nb is set to be 0.01 to 0.30%. A more desirable range is 0.02 to 0.25%.

(P: 0.10% or Less)

P is an element contained in molten iron, and is the element segregating at the grain boundary, and lowering the low-temperature toughness in accordance with increase in a content. Accordingly, the P content is desirable as it is lower, and it is set to be 0.10% or less because when it is contained over 0.10%, it adversely affects on processability and weldability. In particular, the P content is desirably 0.03% or less when the weldability is considered.

(S: 0.03% or Less)

S is an element contained in molten iron, and it is the element which generates an inclusion such as MnS in which not only cracks at the hot-rolling time are incurred but also the low-temperature toughness is deteriorated when a content thereof is too much. Accordingly, an S content is to be reduced as much as possible, but 0.03% or less is an allowable range, and therefore it is set to be 0.03% or less. Note that the S content when the hole expansion property for some extent is required is desirably 0.01% or less, more desirably 0.005% or less.

(Al: 0.001 to 2.0%)

Al suppresses formation of coarse cementite, and improves the low-temperature toughness. Besides, it can also be used as the deoxidizing material. However, when it is excessively contained, the formation of ferrite is accelerated, and therefore, it becomes difficult to set the volume fraction of either one of or the total of both of the tempered martensite and lower bainite to be 90% or more. Therefore, an Al content is set to be 2.0% or less. The Al content is desirably 1.5% or less. It is difficult to set the Al content to be less than 0.001%, and therefore, this value is set to be a lower limit.

(N: 0.01% or Less (Excluding "0" (Zero))

N improves the strength. However, when it is excessively contained, the fatigue strength is lowered accompanied by increase in a nitrogen-based inclusion such as TiN, AlN, and so on to be starting points of fatigue cracks. Accordingly, it is necessary to set an N content to be 0.01% or less. On the other hand, it is not economically desirable to set the N content to be less than 0.0005%. Therefore, it is desirable to set the N content to be 0.0005% or more.

(O: 0.01% or less (excluding "0" (zero))

O generates oxide, and deteriorates formability, and therefore, it is necessary to suppress a content thereof. In particular, when O exceeds 0.01%, this tendency becomes remarkable. Accordingly, it is necessary to set the O content to be 0.01% or less. On the other hand, it is not economically desirable to set the O content to be less than 0.001%, and therefore, it is desirable to set the O content to be 0.001% or more.

Hereinabove is a basic chemical composition of the hot-rolled steel sheet of the present invention, but it may further contain compositions as stated below.

(One Kind or Two or More Kinds Selected from a Group Made Up of Cu, Ni, Mo, V, Cr)

Cu, Ni, Mo, V, Cr suppress the ferrite transformation at the cooling time, and one kind or two or more kinds selected from this group may be contained because the main phase of the structure of the hot-rolled steel sheet is set to be either one of or both of the tempered martensite and lower bainite. Otherwise, they are elements having effects on improvement in the strength of the hot-rolled steel sheet by precipitation strengthening or solid-solution strengthening, and therefore, one kind or two or more kinds selected from this group may be contained. However, when a content of each of Cu, Ni, Mo, V, Cu is less than 0.01%, the effect cannot be enough obtained. Besides, when the Cu content is over 2.0%, the Ni content is over 2.0%, the Mo content is over 1.0%, the V content is over 0.3%, the Cr content is over 2.0%, the above-stated effect saturates and economic efficiency is lowered.

Accordingly, when Cu, Ni, Mo, V, Cr are contained according to need, it is desirable that the Cu content is 0.01 to 2.0%, the Ni content is 0.01 to 2.0%, the Mo content is 0.01 to 1.0%, the V content is 0.01 to 0.3%, and the Cr content is 0.01 to 2.0%.

(One Kind or Two or More Kinds Selected from a Group Made Up of Mg, Ca, and REM)

Mg, Ca, and REM (rare-earth element) are elements controlling modes of non-metal inclusions to be starting points of fracture, and a cause of deterioration of processability, and improving processability. Accordingly, one kind or two or more kinds selected from this group may be contained. Contents of Mg, Ca, and REM are each set to be 0.0005% or more because an effect becomes remarkable when it is 0.0005% or more. Besides, the above-stated effects saturate and the economic efficiency is lowered when the content of Mg is over 0.01%, the content of Ca is over 0.01%, and the content of REM is over 0.1%. Accordingly, it is desirable that the Mg content is set to be 0.0005 to 0.01%, the Ca content is set to be 0.0005 to 0.01%, and the REM content is set to be 0.0005 to 0.1%.

(B: 0.0002 to 0.01%)

B contributes to set the main phase of the structure of the steel sheet to be either one of or both of the tempered martensite and lower bainite by delaying the ferrite transformation. In addition, B segregates at the grain boundary as same as C, and the low-temperature toughness is improved by increasing the grain boundary strength. Therefore, B may be contained in the hot-rolled steel sheet. However, this effect becomes remarkable when a B content is 0.0002% or more, and therefore, a lower limit of the B content is set to be 0.0002% or more. On the other hand, when the B content is over 0.01%, not only the effect saturates but also the economic efficiency deteriorates. Accordingly, the B content is desirably 0.0002 to 0.01%. It is more desirably 0.0005 to 0.005%, and further desirably 0.0007 to 0.0030%.

Note that it is verified that the effects of the present invention are not damaged if Zr, Sn, Co, Zn, W are contained for 1% or less as a total as for the other elements. Among these elements, there is a possibility in Sn that a flaw occurs at the hot-rolling time, and therefore, an Sn content is desirably 0.05% or less.

The balance is iron and impurities. As the impurities, there are exemplified ones contained in a raw material such as ore and scrap, and ones contained during a manufacturing process.

The hot-rolled steel sheet of the present invention having the structure and chemical composition as stated above is able to improve corrosion resistance by providing a hot-dip galvanized layer by performing a hot-dip galvanizing treatment, further an alloyed galvanized layer by performing an alloying treatment after plating at a surface of the hot-rolled steel sheet described hereinabove. Besides, a plating layer is not limited to pure zinc, and may contain elements such as Si, Mg, Zn, Al, Fe, Mn, Ca, Zr to further improve the corrosion resistance. The plating layer as stated above does not damage the excellent fatigue strength and low-temperature toughness of the present invention.

Besides, the effects of the present invention can be obtained if any of surface treated layers by an organic coat formation, a film laminating, an organic salts/inorganic salts treatment, a non-chromium treatment, and so on may be provided.

[Manufacturing Method of Hot-Rolled Steel Sheet]

Next, a manufacturing method of the hot-rolled steel sheet of the present invention is described.

The volume fraction of either one of or the total of both of the tempered martensite and lower bainite is set to be 90% or more, the average effective crystal grain diameter at the sheet thickness ¼ part is set to be 10 μm or less, and the average effective crystal grain diameter at the part of the range of 50 μm from the surface is set to be 6 μm or less to enable the excellent fatigue strength and low-temperature toughness. It is desirable that either one of or both of the tempered martensite and lower bainite contain the iron-based carbide for $1 \times 10^6$ (pieces/mm$^2$), and the average aspect ratio of the effective crystal grains of either one of or both of the tempered martensite and lower bainite is set to be two or less. Details of the manufacturing method to simultaneously satisfy the above are described below.

A manufacturing method preceding to the hot-rolling is not particularly limited. Namely, the composition is adjusted to be the above-stated composition by performing smelting by a shaft furnace, an electric furnace, and so on, and various secondary smeltings subsequent thereto, and next, it may be casted by a method such as a normal continuous casting, a casting by the ingot method, and the thin slab casting.

In case of the continuous casting, the hot-rolling may be performed after it is once cooled to a low-temperature, then heated again, or the ingot may be hot-rolled without cooling to the room temperature. Besides, a cast slab may be continuously hot-rolled. A scrap may be used for a raw material as long as the composition can be controlled within a range of the present invention.

The hot-rolled steel sheet excellent in the fatigue strength and low-temperature toughness of the present invention can be obtained when the following essential conditions are satisfied.

When the hot-rolled steel sheet is manufactured, after it is smelted to be a predetermined steel sheet composition, the cast slab is directly or once cooled, then heated to 1200° C. or more. At a final stage of the finish rolling, when a diameter of a rolling mill roll is set to be R/mm, and a reduction ratio is set to be r %, the hot-rolling is completed under a condition satisfying $R/(100-r) \geq 8$, and at 900° C. or more. It is cooled at an average cooling rate of 60° C./sec or more from the finish rolling temperature to 700° C., cooled at the average cooling rate of 50° C./sec or more from 700° C. to 400° C., and cooled at the average cooling rate of less than 50° C./sec from 400° C. to the room temperature. It is thereby possible to manufacture the hot-rolled steel sheet excellent in the fatigue strength and low-temperature toughness and having the tensile strength of 980 MPa or more.

A slab heating temperature of the hot-rolling is necessary to be set at 1200° C. or more. In the hot-rolled steel sheet of the present invention, coarsening suppression of austenite grains is performed by using either one of or both of solid-solution Ti and Nb, and therefore, it is necessary to remelt either one of or both of NbC and TiC which are precipitated at the casting time. When the slab heating temperature is less than 1200° C., carbides of either one of or both of Nb and Ti require a long time to be melted, and therefore, subsequent refining of the crystal grain diameter and the effect of improvement in the low-temperature toughness owing thereto do not occur. Accordingly, it is necessary to set the slab heating temperature at 1200° C. or more. Besides, an upper limit of the slab heating temperature is not particularly limited, and the effect of the present invention is exerted, but it is not economically preferable to set the heating temperature excessively high. Therefore, the upper limit of the slab heating temperature is desirably set to be less than 1300° C.

At the final stage of the finish rolling, when the diameter of the rolling mill roll is set to be R/mm, and the reduction ratio is set to be r %, the condition of $R/(100-r) \geq 8$ is necessary to be satisfied. The inventors eagerly proceeded studies, and found that when the condition of $R/(100-r) \geq 8$ is satisfied, it is possible to manufacture the hot-rolled steel sheet having the high fatigue strength because the average effective crystal grain diameter at the part of the range of 50 μm from the surface is 6 μm or less. Causes thereof are not certain, but it can be estimated that a value of $R/(100-r)$ is set to be large, shear strains applied on the surface layer of the hot-rolled steel sheet at the final stage of the finish rolling is enlarged, and thereby, a strain concentrated part becomes a nucleation site of ferrite at the transformation time after the rolling, and the structure of the surface layer is refined. When the condition is set to be $R/(100-r) \geq 9.2$, the average effective crystal grain diameter at the part of the range of 50 m from the surface is 5 μm or less, further, when the condition is set to be $R/(100-r) \geq 10.3$, the structure whose average effective crystal grain diameter at the part of the range of 50 μm from the surface is 4 μm or less can be obtained.

It is necessary to set the finish rolling temperature at 900° C. or more. The hot-rolled steel sheet of the present invention contains either one of or both of a lot of Ti and Nb to refine the austenite grain diameter. As a result, austenite is difficult to be recrystallized, becomes a grain extending in the rolling direction to incur the deterioration of toughness resulting from the finish rolling at a temperature region of less than 900° C. Note that an upper limit of the finish rolling temperature is desirably 1040° C.

It is necessary to cool at the average cooling rate of 60° C./sec or more from the finish rolling temperature to 700° C. When the average cooling rate is less than 60° C./sec, the recrystallization excessively proceeds at the surface layer after the rolling, and the average effective crystal grain diameter at the part of the range of 50 m from the surface exceeds 6 μm. This is because when the value of $R/(100-r)$ is large, the large shear strain is applied on the surface layer, and strain induced recrystallization occurs.

As stated above, at the final stage of the finish rolling, the hot-rolling is finished under the condition in which $R/(100-r) \geq 8$ is satisfied and at 900° C. or more when the diameter of the rolling mill roll is set to be R/mm, and the reduction ratio is set to be r %. It is thereby possible to control such that the average effective crystal grain diameter becomes 10 μm or less at the sheet thickness ¼ part, and 6 μm or less at the part of the range of 50 μm from the surface. The fatigue strength and low-temperature toughness are thereby improved. Note that the volume fraction of either one of or the total of both of the tempered martensite and lower bainite is 90% or more, and therefore, most part of the average effective crystal grain diameter is made up of the crystals of these structures.

It is cooled at the average cooling rate of 50° C./sec or more from subsequent 700° C. to 400° C.

When the cooling rate from the finish rolling temperature to 400° C. is less than 50° C./sec, ferrite is generated during the cooling, and it is difficult to set the volume fraction of either one of or the total of both of the tempered martensite and lower bainite being the main phase to be 90% or more. The average cooling rate is therefore set to be 50° C./sec or more from 700° C. to 400° C. Note that if ferrite is not formed during the cooling process, air cooling may be performed at a temperature region on the way.

Note that the cooling rate from a Bs point to a lower bainite formation temperature is preferably set to be 50° C./sec or more. This is to avoid generation of the upper bainite. When the cooling rate from the Bs point to the lower bainite formation temperature is less than 50° C./sec, the upper bainite is formed, and there is a case when fresh martensite (martensite whose dislocation density is high) is generated between laths of bainite, or retained austenite (it becomes the martensite whose dislocation density is high at a process time) exists. Accordingly, baking hardenability and the low-temperature toughness deteriorate. Note that the Bs point is a generation start temperature of the upper bainite, and it is determined by composition, but here, it is conveniently set to be 550° C. Besides, a lower bainite generation temperature is also determined by the composition, but here, it is conveniently set to be 400° C. The cooling rate is set to be 50° C./sec or more from the finish rolling temperature to 400° C., especially from 550° C. to 400° C. The average cooling rate is set to be 50° C./sec or more from the finish rolling temperature to 400° C.

Note that the cooling at the average cooling rate of 50° C./sec or more from the finish rolling temperature to 400° C. (60° C./sec or more at 700° C. or more) means that the condition setting the average cooling rate from the finish rolling temperature to 550° C. at less than 50° C./sec is included. However, there is a case when the upper bainite is easy to be generated under this condition, and there is a case when the upper bainite of 10% or more in the volume fraction may be partially generated. Therefore, it is desirable that the cooling rate from 550° C. to 400° C. is set to be 50° C./sec or more.

It is necessary to set the average cooling rate from 400° C. to the room temperature at less than 50° C./sec. This is to enable the structure in which either one of or both of the tempered martensite and lower bainite are set to be the main phase, and the number density of the iron-based carbide is within the above-stated range. When the average cooling rate is 50° C./sec or more, the iron-based carbide is not able to be set to be the above-stated range, and the high fatigue strength and toughness cannot be obtained. Accordingly, it is necessary to set the average cooling rate at less than 50° C./sec.

Here, "the cooling at the average cooling rate of less than 50° C./sec from 400° C. to the room temperature" does not mean only to cool, but also an isothermal holding, namely coiling at less than 400° C. is included. Further, the cooling rate control at this temperature region is aimed for the control of the dislocation density and the number density of the iron-based carbide in the structure of the hot-rolled steel sheet, and therefore, it is possible to obtain the maximum tensile strength of 980 MPa or more, the high fatigue strength and high toughness being the effects of the present invention, even when it is once cooled to the martensite transformation start temperature (Ms point) or less, and thereafter the temperature is increased by reheating.

The coiling temperature is necessary to be less than 400° C. When the coiling temperature is 400° C. or more, either or both of the ferrite and upper bainite are formed after the coiling, and it becomes difficult to set the volume fraction of either one of or the total of both of the tempered martensite and lower bainite being the main phase at 90% or more. Accordingly, the coiling temperature is set to be less than 400° C.

In general, it is necessary to suppress the ferrite transformation to obtain the martensite, and the cooling at 50° C./sec or more is necessary. In addition, a temperature region is transit from a temperature region which is difficult to be cooled whose heat transfer coefficient called as a film boiling region is relatively low at a low temperature to a temperature region which is easy to be cooled whose heat transfer coefficient called as a nucleate boiling temperature region is large. Accordingly, when the temperature region at less than 400° C. is set to be a cooling stop temperature, the coiling temperature is easy to vary, and a quality of material varies according to the coiling temperature variation. Accordingly, there is often the case in which the normal coiling temperature is set to be either over 400° C. or the coiling at the room temperature.

As a result, it is estimated that it is conventionally difficult to find that the maximum tensile strength of 980 MPa or more, and the excellent fatigue strength and low-temperature toughness can be simultaneously secured by the coiling from 400° C. to the room temperature and the lowering of the cooling rate as the present invention.

Note that it is desirable to perform a skin pass rolling at a reduction ratio of 0.1 to 2% after all processes are completed aiming for enabling correction of a shape of the hot-rolled steel sheet and improvement in ductility by introduction of mobile dislocation. Besides, acid cleaning may be performed for the obtained hot-rolled steel sheet according to need after all processes are completed aiming for removal of scales attached to a surface of the obtained hot-rolled steel sheet. Further, a skin pass or cold rolling may be performed inline or offline at a reduction ratio of 10% or less for the obtained hot-rolled steel sheet after the acid cleaning.

The hot-rolled steel sheet of the present invention is manufactured by passing through the continuous casting, rough rolling, finish rolling, or acid cleaning being the normal hot-rolling process. Note that it is possible to secure the maximum tensile strength of 980 MPa or more and excellent fatigue strength and low-temperature toughness being the effects of the present invention even if it is manufactured while excluding a part of the process.

Besides, it is possible to secure the maximum tensile strength of 980 MPa or more and high fatigue strength and low-temperature toughness being the effects of the present invention even if the heat treatment is performed online or offline within a temperature range of 100 to 600° C. after the hot-rolled steel sheet is once manufactured aiming for precipitation of carbide.

The steel sheet with the maximum tensile strength of 980 MPa or more according to the present invention indicates a steel sheet whose maximum tensile stress by a tensile test performed based on JIS Z 2241 by using a JIS No. 5 test piece cut out in a vertical direction relative to the rolling direction of hot-rolling is 980 MPa or more.

The steel sheet which is excellent in the fatigue strength according to the present invention indicates a steel sheet whose fatigue strength at ten million cycles obtained by the plane bending fatigue test performed based on JIS Z 2275 is 600 MPa or more.

The steel sheet which is excellent in the toughness in low-temperature according to the present invention indicates a steel sheet whose fracture appearance transition temperature (vTrs) of the Charpy test performed based on JIS Z 2242 is −40° C. or less.

In the present invention, the target hot-rolled steel sheet is mainly used for vehicles, and therefore, it is often the case that the sheet thickness becomes around 3 mm. Therefore, the surface of the hot-rolled steel sheet is polished, and the hot-rolled steel sheet is processed to be a 2.5 mm subsize test piece to perform the test.

EXAMPLES

Examples of the present invention are cited to describe technical contents of the present invention. Note that a condition in the present examples is one conditional example which is applied to verify a possibility of embodiments and effects of the present invention, and the present invention is not limited to this one conditional example. The invention may apply various conditions as long as the object of the present invention is attained without departing from the spirit or essential characteristics thereof.

Results of studies by using steels having compositions illustrated in Table 1 are described. Steels from A to P illustrated in Table 1 are examples satisfying the condition of the composition of the present invention, and steels from a to j are examples not satisfying the condition of the composition of the present invention. Note that specifically La and Ce are used as REM.

After these steels were casted, they were heated as they were, or reheated after once cooled to the room temperature to be a temperature range of 1170° C. to 12950° C., and thereafter the hot rolling was performed under each of conditions in Tables 2-1 and 2-2, they were finish-rolled at 889° C. to 1095° C., the cooling and coiling were performed under each of the conditions illustrated in Tables 2-1 and 2-2 to be hot-rolled steel sheets each with a sheet thickness of 3.4 mm. After that, the acid cleaning was performed, and then the skin pass rolling at 0.5% was performed.

In Tables 2-1 and 2-2, the "R" means a rolling mill roll diameter (mm) at the final stage of the finish rolling, and the "r" indicates a reduction ratio (%) at the final stage of the finish rolling. The underline means being out of the range of the present invention. Note that the steels in Tables 2-1, 2-2 are represented by supplying serial numbers for the used steels in Table 1.

Various test pieces were cut out of the obtained hot-rolled steel sheet, and a material test, a structure observation, and so on were performed. As the tensile test, the JIS No. 5 test piece was cut out in a direction vertical to the rolling direction, and the test was performed based on JIS Z 2242.

The fatigue strength was evaluated by using the fatigue strength at ten million cycles found by the plane bending fatigue test performed based on JIS Z 2275.

The Charpy test was performed based on JIS Z 2242, and the fracture appearance transition temperature was measured. The sheet thickness of the hot-rolled steel sheet of the present invention was less than 10 mm, and therefore, front and rear faces of the obtained hot-rolled steel sheet were polished to set the thickness to be 2.5 mm, and thereafter, the Charpy test was performed.

A part of the hot-rolled steel sheets were heated to 660 to 720° C., the hot-dip galvanizing treatment or an alloying heat treatment at 540 to 580° C. was performed after plating treatment was performed to make it a hot-dip galvanized steel sheet (GI) or an alloyed hot-dip galvanized steel sheet (GA), and thereafter, the material test was performed.

The microstructure observation is performed according to the above-stated method, then the volume fraction of each structure, the number density of the iron-based carbide, the effective crystal grain diameter, and the average aspect ratio were measured.

Results are illustrated in Tables 3-1 to 3-3. In Tables 3-1 to 3-3, the underline means being out of the range of the present invention. Besides, the "HR" means the hot-rolled steel sheet, the "GI" means the hot-dip galvanized steel sheet, the "GA" means a plated steel sheet in which the alloying hot-dip galvanizing is performed for the hot-rolled steel sheet.

Only ones satisfying the condition of the present invention had the maximum tensile strength of 980 MPa or more, the high fatigue strength and low-temperature toughness.

On the other hand, in each of steels B-10, G-3, K-4, the slab heating temperature was less than 1200° C., and the iron-based carbides of either one of or both of Ti and Nb precipitated at the casting time were difficult to be solved. Accordingly, the effective crystal grain diameter could not be set to be within the range of the present invention even though the other hot-rolling conditions were set to be within the range of the present invention, and the low-temperature toughness was deteriorated.

In each of steels A-8, C-4, F-3, K-5, O-2, when the rolling mill roll diameter was set to be R/mm, and the reduction ratio was set to be r %, the R/(100−r) became less than eight at the final stage of the finish rolling, enough strain was not applied for the surface layer of the hot-rolled steel sheet, and therefore, the average effective crystal grain diameter at the part of the range of 50 μm from the surface was coarsened, and the fatigue strength was deteriorated.

In each of steels A-9, B-11, G-4, K-6, the finish rolling temperature was too low to be the rolling at the non-recrystallized austenite region, and therefore, the grain was extended in the rolling direction. Accordingly, the average aspect ratio was large, and the low-temperature toughness was deteriorated.

In each of steels A-10, D-3, H-3, K-7, N-2, O-3, the cooling rate from the finish rolling temperature to 700° C. was less than 60° C./sec, the crystal grains in the vicinity of the surface layer were recrystallized during the cooling, the average effective crystal grain diameter became large, and therefore, the fatigue strength was deteriorated.

In each of steels A-11, A-13, D-4, H-4, K-8, K-10, the cooling rate from 700 to 400° C. was less than 50° C./sec, and the ferrite or upper bainite was formed during the cooling. Therefore, the tensile strength and the fatigue strength were difficult to be secured, and the low-temperature toughness was deteriorated because boundaries between the ferrite and the martensite became the starting points of fracture.

In each of steels A-12, B-12, I-2, K-9, the cooling rate from 400° C. to the room temperature was 50° C./sec or more, the precipitation amount of carbide was insufficient, and therefore, the low-temperature toughness was deteriorated.

In each of steels A-13, D-4, K-10, the coiling temperature was 400° C. or more, and an amount of ferrite or the upper bainite structure becomes large in the structure of the steel sheet. Accordingly, it was difficult to secure the tensile strength and the fatigue strength. In addition, the coarse iron-based carbides precipitated between laths existing in the upper bainite structure became the starting points of fracture, and therefore, the low-temperature toughness was deteriorated.

Besides, as it can be seen from each of steels A-4, B-2, 9, C-2, 3, K-3, L-7, M-1, the quality of material of the present invention could be secured even if the hot-dip galvanizing treatment or the alloyed hot-dip galvanizing treatment was performed.

On the other hand, in each of steels a1 to j1 whose steel sheet composition did not satisfy the range of the present invention, the tensile strength of 980 MPa or more, the excellent fatigue strength and low-temperature toughness defined in the present invention could not be obtained.

Note that when a sample was tried to be manufactured under the same condition as the steel A-1 except that the O content exceeds 0.01 mass %, there was a problem in processability, and it was verified that it could not be treated as a product.

TABLE 1

| STEEL | C | Si | Mn | P | S | Al | N | O | Ti | Nb | Ti + Nb | OTHERS | (CHEMICAL COMPOSITION: MASS %) REMARKS |
|---|---|---|---|---|---|---|---|---|---|---|---|---|---|
| A | 0.064 | 1.28 | 2.03 | 0.008 | 0.0042 | 0.034 | 0.0035 | 0.0031 | 0.210 | 0.000 | 0.210 | — | COMPOSITION |
| B | 0.071 | 1.00 | 2.13 | 0.013 | 0.0030 | 0.027 | 0.0031 | 0.0022 | 0.000 | 0.060 | 0.060 | — | CONDITION |

TABLE 1-continued

| STEEL | C | Si | Mn | P | S | Al | N | O | Ti | Nb | Ti + Nb | OTHERS | (CHEMICAL COMPOSITION: MASS %) REMARKS |
|---|---|---|---|---|---|---|---|---|---|---|---|---|---|
| C | 0.052 | 0.51 | 2.40 | 0.015 | 0.0034 | 0.022 | 0.0028 | 0.0027 | 0.106 | 0.022 | 0.128 | Cu = 0.24 | IS SATISFIED |
| D | 0.081 | 1.87 | 1.84 | 0.007 | 0.0041 | 0.038 | 0.0021 | 0.0036 | 0.057 | 0.017 | 0.074 | Ni = 0.14 | |
| E | 0.076 | 1.11 | 1.13 | 0.014 | 0.0025 | 0.030 | 0.0042 | 0.0037 | 0.154 | 0.030 | 0.184 | Mo = 0.50 | |
| F | 0.057 | 1.02 | 3.70 | 0.040 | 0.0049 | 0.025 | 0.0044 | 0.0031 | 0.039 | 0.016 | 0.055 | V = 0.13 | |
| G | 0.065 | 0.96 | 2.18 | 0.087 | 0.0021 | 0.040 | 0.0042 | 0.0024 | 0.021 | 0.012 | 0.033 | Cr = 0.67 | |
| H | 0.059 | 1.20 | 2.41 | 0.031 | 0.0131 | 0.021 | 0.0030 | 0.0020 | 0.105 | 0.000 | 0.105 | Mg = 0.005 | |
| I | 0.082 | 0.85 | 2.67 | 0.024 | 0.0044 | 1.310 | 0.0040 | 0.0015 | 0.042 | 0.029 | 0.071 | Ca = 0.003 | |
| J | 0.067 | 1.14 | 2.34 | 0.007 | 0.0029 | 0.034 | 0.0076 | 0.0031 | 0.109 | 0.015 | 0.124 | REM = 0.042 | |
| K | 0.107 | 0.95 | 1.87 | 0.021 | 0.0045 | 0.028 | 0.0036 | 0.0027 | 0.164 | 0.000 | 0.164 | — | |
| L | 0.110 | 1.65 | 1.74 | 0.013 | 0.0025 | 0.027 | 0.0024 | 0.0040 | 0.000 | 0.041 | 0.041 | B = 0.005 | |
| M | 0.097 | 1.32 | 3.11 | 0.011 | 0.0032 | 0.025 | 0.0041 | 0.0026 | 0.102 | 0.024 | 0.126 | — | |
| N | 0.105 | 0.33 | 1.35 | 0.013 | 0.0032 | 0.036 | 0.0028 | 0.0033 | 0.041 | 0.011 | 0.052 | Cu = 0.11, Cr = 0.20 | |
| O | 0.189 | 1.53 | 2.51 | 0.022 | 0.0029 | 0.032 | 0.0036 | 0.0032 | 0.210 | 0.000 | 0.210 | — | |
| P | 0.197 | 1.23 | 2.16 | 0.034 | 0.0020 | 1.168 | 0.0032 | 0.0019 | 0.064 | 0.006 | 0.070 | — | |
| a | 0.005 | 1.26 | 2.18 | 0.024 | 0.0042 | 0.034 | 0.0031 | 0.0028 | 0.012 | 0.030 | 0.042 | — | COMPOSITION CONDITION IS NOT SATISFIED |
| b | 0.342 | 1.16 | 1.97 | 0.014 | 0.0032 | 0.027 | 0.0034 | 0.0021 | 0.132 | 0.000 | 0.132 | — | |
| c | 0.067 | 3.18 | 2.23 | 0.021 | 0.0029 | 0.029 | 0.0023 | 0.0016 | 0.086 | 0.012 | 0.098 | — | |
| d | 0.067 | 1.37 | 4.81 | 0.026 | 0.0021 | 0.038 | 0.0034 | 0.0020 | 0.127 | 0.016 | 0.143 | — | |
| e | 0.052 | 1.25 | 2.64 | 0.116 | 0.0033 | 0.016 | 0.0028 | 0.0042 | 0.025 | 0.016 | 0.041 | — | |
| f | 0.065 | 0.73 | 1.89 | 0.018 | 0.0510 | 0.013 | 0.0031 | 0.0020 | 0.099 | 0.013 | 0.112 | — | |
| g | 0.059 | 1.46 | 2.28 | 0.011 | 0.0032 | 2.688 | 0.0020 | 0.0021 | 0.088 | 0.020 | 0.108 | — | |
| h | 0.085 | 1.35 | 2.51 | 0.018 | 0.0024 | 0.031 | 0.0176 | 0.0030 | 0.103 | 0.019 | 0.122 | — | |
| i | 0.066 | 1.33 | 2.51 | 0.034 | 0.0022 | 0.025 | 0.0036 | 0.0034 | 0.000 | 0.000 | 0.000 | — | |
| j | 0.050 | 1.26 | 2.22 | 0.017 | 0.0044 | 0.014 | 0.0025 | 0.0034 | 0.308 | 0.035 | 0.343 | — | |

TABLE 2-1

| STEEL | SLAB HEATING TEMPERATURE (° C.) | R/(100 − r) | FINISH ROLLING TEMPERATURE (° C.) | COOLING RATE BETWEEN FINISH AND 700° C. (° C./sec) | COOLING RATE BETWEEN 700° C. AND 400° C. (° C./sec) | COOLING RATE BETWEEN 400° C. AND ROOM TEMPERATURE (° C./sec) | COILING TEMPERATURE (° C.) | REMARKS |
|---|---|---|---|---|---|---|---|---|
| A-1 | 1267 | 8.9 | 1034 | 75 | 64 | 34 | ROOM TEMPERATURE | EXAMPLE |
| A-2 | 1289 | 9.1 | 1016 | 70 | 68 | 33 | ROOM TEMPERATURE | EXAMPLE |
| A-3 | 1217 | 8.8 | 1027 | 80 | 61 | 29 | ROOM TEMPERATURE | EXAMPLE |
| A-4 | 1253 | 10.5 | 1028 | 74 | 66 | 37 | ROOM TEMPERATURE | EXAMPLE |
| A-5 | 1246 | 8.1 | 1025 | 69 | 70 | 31 | ROOM TEMPERATURE | EXAMPLE |
| A-6 | 1246 | 9.0 | 1095 | 79 | 62 | 27 | ROOM TEMPERATURE | EXAMPLE |
| A-7 | 1260 | 8.8 | 957 | 75 | 68 | 28 | ROOM TEMPERATURE | EXAMPLE |
| A-8 | 1255 | 7.8 | 1019 | 71 | 75 | 30 | ROOM TEMPERATURE | COMPARATIVE EXAMPLE |
| A-9 | 1270 | 9.1 | 892 | 73 | 66 | 34 | ROOM TEMPERATURE | COMPARATIVE EXAMPLE |
| A-10 | 1254 | 8.8 | 1014 | 53 | 71 | 24 | ROOM TEMPERATURE | COMPARATIVE EXAMPLE |
| A-11 | 1247 | 8.7 | 1027 | 65 | 42 | 35 | ROOM TEMPERATURE | COMPARATIVE EXAMPLE |
| A-12 | 1243 | 9.1 | 1024 | 73 | 65 | 53 | ROOM TEMPERATURE | COMPARATIVE EXAMPLE |
| A-13 | 1262 | 8.8 | 1016 | 67 | 10 | <0.1 | 420 | COMPARATIVE EXAMPLE |
| B-1 | 1247 | 9.1 | 1025 | 79 | 75 | 36 | ROOM TEMPERATURE | EXAMPLE |
| B-2 | 1244 | 8.7 | 1023 | 101 | 69 | 37 | ROOM TEMPERATURE | EXAMPLE |
| B-3 | 1253 | 8.7 | 1013 | 61 | 69 | 30 | ROOM TEMPERATURE | EXAMPLE |
| B-4 | 1267 | 8.9 | 1018 | 73 | 94 | 35 | ROOM TEMPERATURE | EXAMPLE |
| B-5 | 1256 | 9.0 | 1024 | 69 | 52 | 34 | ROOM TEMPERATURE | EXAMPLE |
| B-6 | 1237 | 8.7 | 1019 | 74 | 63 | 10 | ROOM TEMPERATURE | EXAMPLE |

TABLE 2-1-continued

| STEEL | SLAB HEATING TEMPERATURE (° C.) | R/(100 − r) | FINISH ROLLING TEMPERATURE (° C.) | COOLING RATE BETWEEN FINISH AND 700° C. (° C./sec) | COOLING RATE BETWEEN 700° C. AND 400° C. (° C./sec) | COOLING RATE BETWEEN 400° C. AND ROOM TEMPERATURE (° C./sec) | COILING TEMPERATURE (° C.) | REMARKS |
|---|---|---|---|---|---|---|---|---|
| B-7 | 1240 | 8.9 | 1024 | 79 | 68 | 47 | ROOM TEMPERATURE | EXAMPLE |
| B-8 | 1254 | 8.9 | 1023 | 72 | 61 | <0.1 | 284 | EXAMPLE |
| B-9 | 1261 | 9.0 | 1017 | 74 | 65 | <0.1 | 152 | EXAMPLE |
| B-10 | 1189 | 9.0 | 1024 | 75 | 62 | 31 | ROOM TEMPERATURE | COMPARATIVE EXAMPLE |
| B-11 | 1259 | 8.9 | 889 | 68 | 74 | 29 | ROOM TEMPERATURE | COMPARATIVE EXAMPLE |
| B-12 | 1259 | 8.9 | 1025 | 73 | 64 | 65 | ROOM TEMPERATURE | COMPARATIVE EXAMPLE |
| C-1 | 1241 | 8.8 | 1005 | 70 | 67 | 30 | ROOM TEMPERATURE | EXAMPLE |
| C-2 | 1256 | 9.4 | 986 | 67 | 70 | 29 | ROOM TEMPERATURE | EXAMPLE |
| C-3 | 1270 | 10.5 | 1004 | 79 | 67 | 36 | ROOM TEMPERATURE | EXAMPLE |
| C-4 | 1267 | 7.2 | 1010 | 73 | 61 | 36 | ROOM TEMPERATURE | COMPARATIVE EXAMPLE |
| D-1 | 1271 | 9.0 | 996 | 74 | 71 | 33 | ROOM TEMPERATURE | EXAMPLE |
| D-2 | 1272 | 10.6 | 975 | 80 | 65 | 33 | ROOM TEMPERATURE | EXAMPLE |
| D-3 | 1252 | 8.7 | 980 | 51 | 68 | 36 | ROOM TEMPERATURE | COMPARATIVE EXAMPLE |
| D-4 | 1270 | 8.9 | 982 | 70 | 10 | <0.1 | 583 | COMPARATIVE EXAMPLE |
| E-1 | 1269 | 8.9 | 1024 | 80 | 62 | 30 | ROOM TEMPERATURE | EXAMPLE |
| E-2 | 1269 | 9.6 | 1017 | 74 | 72 | 32 | ROOM TEMPERATURE | EXAMPLE |
| F-1 | 1271 | 9.0 | 1020 | 73 | 62 | 36 | ROOM TEMPERATURE | EXAMPLE |
| F-2 | 1242 | 10.5 | 1026 | 77 | 64 | 29 | ROOM TEMPERATURE | EXAMPLE |
| F-3 | 1248 | 7.6 | 1018 | 75 | 75 | 37 | ROOM TEMPERATURE | COMPARATIVE EXAMPLE |
| G-1 | 1251 | 8.8 | 931 | 74 | 62 | 31 | ROOM TEMPERATURE | EXAMPLE |
| G-2 | 1268 | 8.9 | 947 | 62 | 72 | 34 | ROOM TEMPERATURE | EXAMPLE |
| G-3 | 1185 | 9.1 | 926 | 73 | 69 | 33 | ROOM TEMPERATURE | COMPARATIVE EXAMPLE |
| G-4 | 1255 | 9.1 | 891 | 69 | 75 | 30 | ROOM TEMPERATURE | COMPARATIVE EXAMPLE |
| H-1 | 1253 | 8.8 | 1003 | 68 | 62 | 31 | ROOM TEMPERATURE | EXAMPLE |

TABLE 2-2

| STEEL | SLAB HEATING TEMPERATURE (° C.) | R/(100 − r) | FINISH ROLLING TEMPERATURE (° C.) | COOLING RATE BETWEEN FINISH AND 700° C. (° C./sec) | COOLING RATE BETWEEN 700° C. AND 400° C. (° C./sec) | COOLING RATE BETWEEN 400° C. AND ROOM TEMPERATURE (° C./sec) | COILING TEMPERATURE (° C.) | REMARKS |
|---|---|---|---|---|---|---|---|---|
| H-2 | 1246 | 8.6 | 994 | 69 | 67 | <0.1 | 356 | EXAMPLE |
| H-3 | 1274 | 8.6 | 998 | 56 | 72 | 32 | ROOM TEMPERATURE | COMPARATIVE EXAMPLE |
| H-4 | 1266 | 9.0 | 1006 | 74 | 36 | 35 | ROOM TEMPERATURE | COMPARATIVE EXAMPLE |
| I-1 | 1258 | 8.7 | 965 | 73 | 65 | 32 | ROOM TEMPERATURE | EXAMPLE |
| I-2 | 1272 | 8.9 | 959 | 71 | 70 | 81 | ROOM TEMPERATURE | COMPARATIVE EXAMPLE |
| J-1 | 1252 | 8.7 | 986 | 73 | 75 | 32 | ROOM TEMPERATURE | EXAMPLE |

TABLE 2-2-continued

| STEEL | SLAB HEATING TEMPERATURE (° C.) | R/(100 − r) | FINISH ROLLING TEMPERATURE (° C.) | COOLING RATE BETWEEN FINISH AND 700° C. (° C./sec) | COOLING RATE BETWEEN 700° C. AND 400° C. (° C./sec) | COOLING RATE BETWEEN 400° C. AND ROOM TEMPERATURE (° C./sec) | COILING TEMPERATURE (° C.) | REMARKS |
|---|---|---|---|---|---|---|---|---|
| J-1 | 1270 | 10.5 | 994 | 75 | 68 | 35 | ROOM TEMPERATURE | EXAMPLE |
| K-1 | 1275 | 8.6 | 1016 | 73 | 67 | 32 | ROOM TEMPERATURE | EXAMPLE |
| K-2 | 1255 | 9.7 | 1028 | 68 | 64 | 34 | ROOM TEMPERATURE | EXAMPLE |
| K-3 | 1253 | 10.4 | 1011 | 71 | 72 | 32 | ROOM TEMPERATURE | EXAMPLE |
| K-4 | <u>1178</u> | 8.9 | 1020 | 76 | 69 | 31 | ROOM TEMPERATURE | COMPARATIVE EXAMPLE |
| K-5 | 1241 | <u>7.5</u> | 1024 | 77 | 64 | 36 | ROOM TEMPERATURE | COMPARATIVE EXAMPLE |
| K-6 | 1265 | 8.6 | <u>896</u> | 79 | 67 | 35 | ROOM TEMPERATURE | COMPARATIVE EXAMPLE |
| K-7 | 1245 | 8.8 | 1020 | <u>49</u> | 70 | 32 | ROOM TEMPERATURE | COMPARATIVE EXAMPLE |
| K-8 | 1263 | 9.1 | 1016 | 79 | <u>39</u> | 30 | ROOM TEMPERATURE | COMPARATIVE EXAMPLE |
| K-9 | 1263 | 9.0 | 1032 | 73 | 63 | <u>57</u> | ROOM TEMPERATURE | COMPARATIVE EXAMPLE |
| K-10 | 1256 | 8.6 | 1024 | 67 | <u>10</u> | <0.1 | <u>416</u> | COMPARATIVE EXAMPLE |
| L-1 | 1266 | 8.7 | 920 | 68 | 71 | 35 | ROOM TEMPERATURE | EXAMPLE |
| L-2 | 1295 | 8.7 | 934 | 70 | 64 | 33 | ROOM TEMPERATURE | EXAMPLE |
| L-3 | 1206 | 9.1 | 931 | 67 | 62 | 32 | ROOM TEMPERATURE | EXAMPLE |
| L-4 | 1263 | 9.5 | 928 | 71 | 70 | 34 | ROOM TEMPERATURE | EXAMPLE |
| L-5 | 1248 | 10.4 | 936 | 71 | 75 | 36 | ROOM TEMPERATURE | EXAMPLE |
| L-6 | 1257 | 9.1 | 1034 | 67 | 66 | 34 | ROOM TEMPERATURE | EXAMPLE |
| L-7 | 1248 | 9.0 | 902 | 69 | 73 | 29 | ROOM TEMPERATURE | EXAMPLE |
| M-1 | 1248 | 8.8 | 1024 | 77 | 69 | 33 | ROOM TEMPERATURE | EXAMPLE |
| M-2 | 1259 | 10.0 | 1020 | 69 | 73 | 35 | ROOM TEMPERATURE | EXAMPLE |
| N-1 | 1276 | 10.5 | 976 | 79 | 73 | 32 | ROOM TEMPERATURE | EXAMPLE |
| N-2 | 1270 | 9.0 | 986 | <u>37</u> | 67 | 30 | ROOM TEMPERATURE | COMPARATIVE EXAMPLE |
| O-1 | 1244 | 8.7 | 1032 | 72 | 72 | 34 | ROOM TEMPERATURE | EXAMPLE |
| O-2 | 1255 | <u>7.7</u> | 1046 | 73 | 74 | 30 | ROOM TEMPERATURE | COMPARATIVE EXAMPLE |
| O-3 | 1265 | 8.6 | 1035 | <u>45</u> | 66 | 30 | ROOM TEMPERATURE | COMPARATIVE EXAMPLE |
| P-1 | 1251 | 8.9 | 972 | 77 | 65 | 36 | ROOM TEMPERATURE | EXAMPLE |
| a-1 | 1266 | 9.1 | 1003 | 70 | 72 | 34 | ROOM TEMPERATURE | COMPARATIVE EXAMPLE |
| b-1 | 1270 | 9.4 | 1026 | 74 | 65 | 34 | ROOM TEMPERATURE | COMPARATIVE EXAMPLE |
| c-1 | 1268 | 8.8 | 1018 | 72 | 65 | 31 | ROOM TEMPERATURE | COMPARATIVE EXAMPLE |
| d-1 | 1255 | 8.6 | 1038 | 78 | 69 | 37 | ROOM TEMPERATURE | COMPARATIVE EXAMPLE |
| e-1 | 1245 | 8.7 | 994 | 70 | 65 | 31 | ROOM TEMPERATURE | COMPARATIVE EXAMPLE |
| f-1 | 1270 | 9.2 | 1009 | 80 | 70 | 32 | ROOM TEMPERATURE | COMPARATIVE EXAMPLE |
| g-1 | 1259 | 9.0 | 1011 | 71 | 65 | 32 | ROOM TEMPERATURE | COMPARATIVE EXAMPLE |
| h-1 | 1265 | 9.0 | 1022 | 79 | 65 | 35 | ROOM TEMPERATURE | COMPARATIVE EXAMPLE |
| i-1 | 1270 | 8.9 | 936 | 74 | 62 | 31 | ROOM TEMPERATURE | COMPARATIVE EXAMPLE |

TABLE 2-2-continued

| STEEL | SLAB HEATING TEMPERATURE (° C.) | R/(100 − r) | FINISH ROLLING TEMPERATURE (° C.) | COOLING RATE BETWEEN FINISH AND 700° C. (° C./sec) | COOLING RATE BETWEEN 700° C. AND 400° C. (° C./sec) | COOLING RATE BETWEEN 400° C. AND ROOM TEMPERATURE (° C./sec) | COILING TEMPERATURE (° C.) | REMARKS |
|---|---|---|---|---|---|---|---|---|
| j-1 | 1259 | 9.2 | 1046 | 80 | 62 | 36 | ROOM TEMPERATURE | COMPARATIVE EXAMPLE |

TABLE 3-1

| STEEL | STEEL TYPE | TEMPERED MARTENSITE | LOWER BAINITE | REMAINING STRUCTURE | OTHER STRUCTURES | NUMBER DENSITY OF IRON-BASED CARBIDE × $10^6$ (1/mm$^2$) | AVERAGE EFFECTIVE CRYSTAL GRAIN DIAMETER AT ¼ PART (μm) |
|---|---|---|---|---|---|---|---|
| A-1 | HR | 93 | 7 | 0 | — | 3.5 | 8.6 |
| A-2 | HR | 95 | 5 | 0 |   | 4.0 | 8.9 |
| A-3 | HR | 93 | 6 | 1 | FRESH MARTENSITE | 2.0 | 9.6 |
| A-4 | GI | 90 | 10 | 0 |   | 3.8 | 8.5 |
| A-5 | HR | 89 | 11 | 0 |   | 3.2 | 8.6 |
| A-6 | HR | 91 | 9 | 0 |   | 2.9 | 9.1 |
| A-7 | HR | 86 | 14 |   |   | 3.6 | 6.4 |
| A-8 | GA | 88 | 12 |   |   | 3.9 | 8.4 |
| A-9 | HR | 84 | 16 |   |   | 3.3 | 7.0 |
| A-10 | HR | 86 | 14 |   |   | 3.7 | 8.1 |
| A-11 | HR | 48 | 37 | 15 | FERRITE + UPPER BAINITE | 1.8 | 8.8 |
| A-12 | HR | 80 | 15 | 5 | FRESH MARTENSITE | 0.5 | 8.3 |
| A-13 | HR | 32 | 42 | 26 | FERRITE + UPPER BAINITE | 6.4 | 9.1 |
| B-1 | HR | 92 | 8 |   |   | 4.0 | 8.5 |
| B-2 | GI | 90 | 10 |   |   | 3.4 | 8.4 |
| B-3 | HR | 87 | 13 |   |   | 3.1 | 6.7 |
| B-4 | HR | 91 | 9 |   |   | 3.4 | 8.0 |
| B-5 | HR | 62 | 30 | 8 | FERRITE | 4.0 | 7.9 |
| B-6 | HR | 91 | 9 |   |   | 5.1 | 8.4 |
| B-7 | HR | 85 | 15 |   |   | 1.4 | 8.6 |
| B-8 | HR | 76 | 24 |   |   | 4.9 | 7.6 |
| B-9 | GI | 82 | 18 |   |   | 4.7 | 8.3 |
| B-10 | HR | 86 | 14 |   |   | 3.8 | 11.6 |
| B-11 | GA | 82 | 18 |   |   | 4.2 | 8.8 |
| B-12 | HR | 92 | 1 | 7 | FRESH MARTENSITE | 0.7 | 9.0 |
| C-1 | HR | 87 | 13 |   |   | 3.4 | 8.6 |
| C-2 | GI | 91 | 9 |   |   | 3.7 | 8.4 |
| C-3 | GA | 84 | 16 |   |   | 4.1 | 8.3 |

| STEEL | AVERAGE EFFECTIVE CRYSTAL GRAIN DIAMETER AT PART OF RANGE OF 50 μm FROM SURFACE (μm) | ASPECT RATIO | YP (Mpa) | TS (Mpa) | EI (%) | FATIGUE STRENGTH AT TEN MILLION CYCLES (Mpa) | vTrs (° C.) | REMARKS |
|---|---|---|---|---|---|---|---|---|
| A-1 | 5.2 | 1.6 | 943 | 1068 | 11 | 623 | −60 | EXAMPLE |
| A-2 | 5.5 | 1.7 | 951 | 1073 | 10 | 614 | −60 | EXAMPLE |
| A-3 | 5.3 | 1.4 | 985 | 1095 | 10 | 627 | −50 | EXAMPLE |
| A-4 | 3.5 | 1.5 | 937 | 1048 | 11 | 701 | −70 | EXAMPLE |
| A-5 | 5.9 | 1.7 | 916 | 1036 | 11 | 605 | −60 | EXAMPLE |
| A-6 | 5.6 | 1.2 | 916 | 1059 | 12 | 643 | −80 | EXAMPLE |
| A-7 | 5.1 | 1.9 | 899 | 1035 | 12 | 618 | −50 | EXAMPLE |
| A-8 | 6.8 | 1.5 | 917 | 1046 | 11 | 586 | −70 | COMPARATIVE EXAMPLE |
| A-9 | 5.8 | 2.3 | 890 | 1028 | 13 | 608 | −30 | COMPARATIVE EXAMPLE |
| A-10 | 7.2 | 1.4 | 912 | 1038 | 11 | 591 | −50 | COMPARATIVE EXAMPLE |
| A-11 | 5.7 | 1.3 | 781 | 923 | 15 | 524 | 0 | COMPARATIVE EXAMPLE |
| A-12 | 5.5 | 1.6 | 913 | 1086 | 9 | 628 | 10 | COMPARATIVE EXAMPLE |

TABLE 3-1-continued

| | | | | | | | | |
|---|---|---|---|---|---|---|---|---|
| A-13 | 5.7 | 1.8 | 857 | 966 | 14 | 572 | 30 | COMPARATIVE EXAMPLE |
| B-1 | 5.4 | 1.6 | 960 | 1052 | 10 | 631 | −60 | EXAMPLE |
| B-2 | 5.1 | 1.7 | 956 | 1062 | 11 | 652 | −70 | EXAMPLE |
| B-3 | 5.8 | 1.4 | 937 | 1049 | 11 | 604 | −60 | EXAMPLE |
| B-4 | 5.4 | 1.3 | 932 | 1053 | 10 | 624 | −60 | EXAMPLE |
| B-5 | 5.7 | 1.6 | 836 | 987 | 13 | 601 | −40 | EXAMPLE |
| B-6 | 5.3 | 1.4 | 953 | 1057 | 10 | 649 | −60 | EXAMPLE |
| B-7 | 5.5 | 1.7 | 933 | 1044 | 10 | 627 | −40 | EXAMPLE |
| B-8 | 5.4 | 1.5 | 930 | 1031 | 11 | 618 | −80 | EXAMPLE |
| B-9 | 5.2 | 1.5 | 927 | 1044 | 10 | 622 | −70 | EXAMPLE |
| B-10 | 5.9 | 1.3 | 942 | 1036 | 9 | 610 | −30 | COMPARATIVE EXAMPLE |
| B-11 | 5.4 | 3.1 | 952 | 1058 | 8 | 604 | −20 | COMPARATIVE EXAMPLE |
| B-12 | 5.6 | 1.4 | 983 | 1078 | 7 | 625 | −30 | COMPARATIVE EXAMPLE |
| C-1 | 5.5 | 1.7 | 906 | 1026 | 11 | 613 | −60 | EXAMPLE |
| C-2 | 4.6 | 1.4 | 897 | 1012 | 12 | 657 | −60 | EXAMPLE |
| C-3 | 3.8 | 1.3 | 910 | 1022 | 12 | 694 | −70 | EXAMPLE |

TABLE 3-2

| STEEL | STEEL TYPE | TEMPERED MARTENSITE | LOWER BAINITE | REMAINING STRUCTURE | OTHER STRUCTURES | NUMBER DENSITY OF IRON-BASED CARBIDE × $10^6$ (1/mm$^2$) | AVERAGE EFFECTIVE CRYSTAL GRAIN DIAMETER AT ¼ PART (μm) |
|---|---|---|---|---|---|---|---|
| C-4 | HR | 87 | 13 | | | 3.4 | 8.6 |
| D-1 | HR | 90 | 10 | | | 2.8 | 7.6 |
| D-2 | HR | 92 | 8 | | | 3.0 | 7.5 |
| D-3 | HR | 97 | 3 | | | 3.6 | 8.6 |
| D-4 | HR | 4 | 21 | 75 | FERRITE | 7.6 | 8.7 |
| E-1 | HR | 94 | 6 | | | 3.8 | 7.9 |
| E-2 | HR | 90 | 10 | | | 3.4 | 7.8 |
| F-1 | HR | 87 | 13 | | | 2.8 | 8.1 |
| F-2 | HR | 91 | 9 | | | 2.6 | 7.8 |
| F-3 | HR | 88 | 12 | | | 2.5 | 7.6 |
| G-1 | HR | 90 | 10 | | | 3.7 | 8.5 |
| G-2 | HR | 92 | 8 | | | 2.4 | 9.0 |
| G-3 | GI | 82 | 18 | | | 3.0 | 10.7 |
| G-4 | GA | 87 | 13 | | | 3.4 | 7.8 |
| H-1 | HR | 88 | 12 | | | 2.5 | 8.4 |
| H-2 | HR | 40 | 52 | 8 | UPPER BAINITE | 6.8 | 7.9 |
| H-3 | HR | 84 | 16 | | | 3.6 | 8.3 |
| H-4 | HR | 32 | 47 | 21 | FERRITE + UPPER BAINITE | 5.9 | 8.0 |
| I-1 | HR | 71 | 22 | 7 | FERRITE | 3.4 | 8.1 |
| I-2 | HR | 34 | 21 | 45 | FRESH MARTENSITE | 0.5 | 7.7 |
| J-1 | HR | 90 | 10 | | | 3.2 | 8.4 |
| J-1 | HR | 87 | 13 | | | 2.9 | 7.5 |
| K-1 | HR | 94 | 6 | | | 3.4 | 7.6 |
| K-2 | HR | 93 | 7 | | | 3.4 | 7.9 |
| K-3 | GI | 90 | 10 | | | 3.0 | 7.1 |
| K-4 | GA | 99 | 1 | | | 2.7 | 10.5 |
| K-5 | HR | 96 | 4 | | | 3.4 | 9.0 |
| K-6 | HR | 94 | 6 | | | 3.0 | 6.8 |

| STEEL | AVERAGE EFFECTIVE CRYSTAL GRAIN DIAMETER AT PART OF RANGE OF 50 μm FROM SURFACE (μm) | ASPECT RATIO | YP (Mpa) | TS (Mpa) | EI (%) | FATIGUE STRENGTH AT TEN MILLION CYCLES (Mpa) | vTrs (° C.) | REMARKS |
|---|---|---|---|---|---|---|---|---|
| C-4 | 6.5 | 1.6 | 902 | 1030 | 11 | 582 | −50 | COMPARATIVE EXAMPLE |
| D-1 | 5.4 | 1.4 | 956 | 1096 | 8 | 653 | −50 | EXAMPLE |
| D-2 | 3.4 | 1.6 | 999 | 1105 | 8 | 736 | −60 | EXAMPLE |
| D-3 | 6.6 | 1.7 | 986 | 1082 | 8 | 597 | −40 | COMPARATIVE EXAMPLE |
| D-4 | 5.8 | 1.6 | 794 | 922 | 14 | 539 | 20 | COMPARATIVE EXAMPLE |
| E-1 | 5.7 | 1.5 | 974 | 1067 | 9 | 661 | −60 | EXAMPLE |
| E-2 | 4.2 | 1.4 | 966 | 1050 | 10 | 684 | −60 | EXAMPLE |
| F-1 | 5.4 | 1.4 | 931 | 1043 | 10 | 647 | −70 | EXAMPLE |

TABLE 3-2-continued

| | | | | | | | | |
|---|---|---|---|---|---|---|---|---|
| F-2 | 3.7 | 1.7 | 927 | 1030 | 11 | 682 | −70 | EXAMPLE |
| F-3 | 7.1 | 1.5 | 931 | 1027 | 10 | 574 | −60 | COMPARATIVE EXAMPLE |
| G-1 | 5.6 | 1.6 | 905 | 1016 | 11 | 612 | −70 | EXAMPLE |
| G-2 | 6.0 | 1.4 | 882 | 1013 | 12 | 602 | −70 | EXAMPLE |
| G-3 | 5.7 | 1.5 | 869 | 1024 | 12 | 611 | −30 | COMPARATIVE EXAMPLE |
| G-4 | 5.1 | 3.7 | 910 | 1036 | 12 | 610 | −20 | COMPARATIVE EXAMPLE |
| H-1 | 5.3 | 1.4 | 884 | 1009 | 13 | 615 | −70 | EXAMPLE |
| H-2 | 5.6 | 1.6 | 860 | 983 | 14 | 606 | −40 | EXAMPLE |
| H-3 | 6.2 | 1.3 | 894 | 1014 | 12 | 586 | −50 | COMPARATIVE EXAMPLE |
| H-4 | 5.7 | 1.7 | 850 | 969 | 15 | 573 | −30 | COMPARATIVE EXAMPLE |
| I-1 | 5.4 | 1.4 | 890 | 992 | 16 | 618 | −40 | EXAMPLE |
| I-2 | 5.2 | 1.6 | 905 | 1025 | 10 | 620 | −20 | COMPARATIVE EXAMPLE |
| J-1 | 5.5 | 1.5 | 918 | 1020 | 10 | 613 | −60 | EXAMPLE |
| J-1 | 3.8 | 1.3 | 907 | 1012 | 11 | 675 | −60 | EXAMPLE |
| K-1 | 5.3 | 1.3 | 1084 | 1209 | 8 | 716 | −60 | EXAMPLE |
| K-2 | 4.2 | 1.5 | 1076 | 1214 | 9 | 766 | −70 | EXAMPLE |
| K-3 | 3.4 | 1.3 | 1076 | 1208 | 8 | 798 | −60 | EXAMPLE |
| K-4 | 5.8 | 1.5 | 1090 | 1211 | 8 | 720 | −20 | COMPARATIVE EXAMPLE |
| K-5 | 6.8 | 1.3 | 1067 | 1197 | 8 | 591 | −60 | COMPARATIVE EXAMPLE |
| K-6 | 5.3 | 2.9 | 1102 | 1219 | 7 | 652 | −30 | COMPARATIVE EXAMPLE |

TABLE 3-3

| STEEL | STEEL TYPE | TEMPERED MARTENSITE | LOWER BAINITE | REMAINING STRUCTURE | OTHER STRUCTURES | NUMBER DENSITY OF IRON-BASED CARBIDE × $10^6$ (1/mm$^2$) | AVERAGE EFFECTIVE CRYSTAL GRAIN DIAMETER AT ¼ PART (μm) |
|---|---|---|---|---|---|---|---|
| K-7 | HR | 91 | 9 | | | 3.5 | 8.2 |
| K-8 | HR | 12 | 34 | 54 | FERRITE + UPPER BAINITE | 7.0 | 8.3 |
| K-9 | HR | 31 | 9 | 60 | FRESH MARTENSITE | 0.6 | 7.8 |
| K-10 | HR | 23 | 5 | 72 | FERRITE + UPPER BAINITE | 5.5 | 7.6 |
| L-1 | HR | 82 | 18 | | | 3.7 | 7.4 |
| L-2 | HR | 83 | 17 | | | 2.9 | 7.6 |
| L-3 | HR | 85 | 15 | | | 3.8 | 9.5 |
| L-4 | HR | 90 | 10 | | | 3.1 | 8.6 |
| L-5 | HR | 87 | 13 | | | 3.5 | 8.0 |
| L-6 | HR | 91 | 9 | | | 3.0 | 9.5 |
| L-7 | GI | 75 | 19 | 6 | UPPER BAINITE | 2.7 | 5.4 |
| M-1 | GA | 90 | 10 | | | 2.8 | 7.6 |
| M-2 | HR | 91 | 9 | | | 3.4 | 7.5 |
| N-1 | HR | 87 | 13 | | | 3.3 | 7.3 |
| N-2 | HR | 92 | 8 | | | 2.7 | 7.8 |
| O-1 | HR | 89 | 11 | | | 4.2 | 8.2 |
| O-2 | HR | 85 | 15 | | | 4.6 | 7.5 |
| O-3 | HR | 90 | 10 | | | 5.0 | 7.4 |
| P-1 | HR | 87 | 13 | | | 4.9 | 8.0 |
| a-1 | HR | 0 | 0 | 100 | FERRITE | — | 9.3 |
| b-1 | HR | 92 | 8 | | | 10.5 | 6.5 |
| c-1 | HR | 63 | 14 | 23 | FERRITE | 3.2 | 8.2 |
| d-1 | GI | 96 | 4 | | | 0.8 | 8.6 |
| e-1 | HR | 91 | 9 | | | 3.6 | 8.0 |
| f-1 | HR | 92 | 8 | | | 3.1 | 9.0 |
| g-1 | GA | 76 | 12 | 12 | FERRITE | 2.8 | 8.5 |
| h-1 | HR | 93 | 7 | | | 3.6 | 8.7 |
| i-1 | HR | 90 | 10 | | | 2.7 | 11.1 |
| j-1 | HR | 87 | 13 | | | 3.6 | 7.6 |

TABLE 3-3-continued

| STEEL | AVERAGE EFFECTIVE CRYSTAL GRAIN DIAMETER AT PART OF RANGE OF 50 μm FROM SURFACE (μm) | ASPECT RATIO | YP (Mpa) | TS (Mpa) | EI (%) | FATIGUE STRENGTH AT TEN MILLION CYCLES (Mpa) | vTrs (° C.) | REMARKS |
|---|---|---|---|---|---|---|---|---|
| K-7 | 6.3 | 1.7 | 1087 | 1230 | 8 | 588 | −60 | COMPARATIVE EXAMPLE |
| K-8 | 5.7 | 1.6 | 871 | 973 | 10 | 561 | −10 | COMPARATIVE EXAMPLE |
| K-9 | 5.4 | 1.4 | 1096 | 1251 | 7 | 682 | −10 | COMPARATIVE EXAMPLE |
| K-10 | 5.6 | 1.7 | 866 | 968 | 11 | 576 | 30 | COMPARATIVE EXAMPLE |
| L-1 | 5.4 | 1.5 | 1118 | 1269 | 9 | 764 | −50 | EXAMPLE |
| L-2 | 5.3 | 1.5 | 1099 | 1236 | 9 | 781 | −50 | EXAMPLE |
| L-3 | 6.0 | 1.7 | 1054 | 1225 | 9 | 755 | −40 | EXAMPLE |
| L-4 | 4.8 | 1.3 | 1067 | 1218 | 10 | 782 | −50 | EXAMPLE |
| L-5 | 3.7 | 1.5 | 1101 | 1230 | 9 | 813 | −50 | EXAMPLE |
| L-6 | 5.8 | 1.1 | 1094 | 1210 | 9 | 746 | −60 | EXAMPLE |
| L-7 | 5.1 | 1.9 | 1058 | 1179 | 9 | 627 | −50 | EXAMPLE |
| M-1 | 5.6 | 1.4 | 1024 | 1183 | 10 | 706 | −50 | EXAMPLE |
| M-2 | 4.5 | 1.6 | 1039 | 1200 | 10 | 769 | −70 | EXAMPLE |
| N-1 | 4.4 | 1.4 | 1042 | 1207 | 9 | 776 | −50 | EXAMPLE |
| N-2 | 6.6 | 1.1 | 1022 | 1172 | 9 | 573 | −50 | COMPARATIVE EXAMPLE |
| O-1 | 5.3 | 1.5 | 1204 | 1437 | 8 | 782 | −50 | EXAMPLE |
| O-2 | 6.2 | 1.3 | 1189 | 1379 | 8 | 590 | −50 | COMPARATIVE EXAMPLE |
| O-3 | 6.1 | 1.7 | 1201 | 1426 | 8 | 591 | −40 | COMPARATIVE EXAMPLE |
| P-1 | 5.6 | 1.5 | 1183 | 1355 | 8 | 764 | −50 | EXAMPLE |
| a-1 | 5.8 | 1.1 | 403 | 628 | 24 | 302 | −90 | COMPARATIVE EXAMPLE |
| b-1 | 5.1 | 1.4 | 1503 | 1683 | 5 | 701 | 30 | COMPARATIVE EXAMPLE |
| c-1 | 5.4 | 1.6 | 713 | 864 | 15 | 551 | 40 | COMPARATIVE EXAMPLE |
| d-1 | 5.6 | 1.7 | 926 | 1035 | 12 | 652 | −10 | COMPARATIVE EXAMPLE |
| e-1 | 5.3 | 1.4 | 936 | 1054 | 11 | 657 | 20 | COMPARATIVE EXAMPLE |
| f-1 | 5.8 | 1.2 | 904 | 1018 | 11 | 625 | 30 | COMPARATIVE EXAMPLE |
| g-1 | 5.1 | 1.6 | 813 | 927 | 15 | 561 | 30 | COMPARATIVE EXAMPLE |
| h-1 | 5.4 | 1.3 | 926 | 1034 | 10 | 532 | −50 | COMPARATIVE EXAMPLE |
| i-1 | 6.0 | 1.6 | 904 | 1017 | 9 | 603 | 40 | COMPARATIVE EXAMPLE |
| j-1 | 5.2 | 3.0 | 906 | 1035 | 10 | 625 | −20 | COMPARATIVE EXAMPLE |

INDUSTRIAL APPLICABILITY

The present invention is an art effective for a hot-rolled steel sheet having a maximum tensile strength of 980 MPa or more and excellent in fatigue strength and low-temperature toughness, and a manufacturing method thereof. According to the present invention, it is possible to provide the hot-rolled steel sheet which is excellent in the fatigue strength and low-temperature toughness, and has the maximum tensile strength of 980 MPa or more. This hot-rolled steel sheet is easy to process, capable of being used at a very cold district, and therefore, industrial contribution thereof is extremely remarkable.

The invention claimed is:
1. A hot-rolled steel sheet, comprising:
a composition containing in mass %,
C: 0.01 to 0.2%;
Si: 2.5% or less (excluding "0" (zero));
Mn: 4.0% or less (excluding "0" (zero));
P: 0.10% or less;
S: 0.03% or less;
Al: 0.001 to 2.0%;
N: 0.01% or less (excluding "0" (zero));
O: 0.01% or less (excluding "0" (zero));
Cu: "0" (zero) to 2.0%;
Ni: "0" (zero) to 2.0%;
Mo: "0" (zero) to 1.0%;
V: "0" (zero) to 0.3%;
Cr: "0" (zero) to 2.0%;
Mg: "0" (zero) to 0.01%;
Ca: "0" (zero) to 0.01%;
REM: "0" (zero) to 0.1%;
B: "0" (zero) to 0.01%; and
Ti+Nb: 0.01 to 0.30%, and the balance made up of iron and impurities, and
a structure comprises lower bainite generated at less than 400° C., a volume fraction of lower bainite generated at less than 400° C. is 5% or more, and a total of volume fractions of both of tempered martensite and lower bainite generated at less than 400° C. is 90% or more, wherein an average effective crystal grain diameter of effective crystal grains in a region between a surface of the steel sheet and a position at a depth of ¼ of a sheet thickness from the surface, in the whole steel sheet, is 10 μm or less, and wherein an average effective crystal grain diameter in a region from the surface of the steel sheet to a position at a depth of 50 μm from the surface is 6 μm or less.

2. The hot-rolled steel sheet according to claim 1, wherein iron-based carbides existing in the either one or both of tempered martensite and lower bainite are $1 \times 10^6$ (pieces/mm$^2$) or more, and an average aspect ratio of the effective crystal grains of the either one or both of tempered martensite and lower bainite is two or less.

3. The hot-rolled steel sheet according to claim 1, further comprising, in mass %, one kind or two or more kinds selected from a group made up of:

Cu: 0.01 to 2.0%;
Ni: 0.01 to 2.0%;
Mo: 0.01 to 1.0%;
V: 0.01 to 0.3%; and
Cr: 0.01 to 2.0%.

4. The hot-rolled steel sheet according to claim 1, further comprising, in mass %, one kind or two or more kinds selected from a group made up of:

Mg: 0.0005 to 0.01%;
Ca: 0.0005 to 0.01%; and
REM: 0.0005 to 0.1%.

5. The hot-rolled steel sheet according to claim 1, further comprising, in mass %, B: 0.0002 to 0.01%.

6. The hot-rolled steel sheet according to claim 1, wherein a galvanized layer or an alloyed galvanized layer is included at a surface of the steel sheet.

* * * * *